(12) United States Patent
Sakata

(10) Patent No.: US 10,243,605 B2
(45) Date of Patent: *Mar. 26, 2019

(54) SHORT-RANGE WIRELESS COMMUNICATION APPARATUS

(71) Applicant: DENSO CORPORATION, Kariya, Aichi-pref. (JP)

(72) Inventor: Ryuuji Sakata, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/873,021

(22) Filed: Jan. 17, 2018

(65) Prior Publication Data

US 2018/0145712 A1 May 24, 2018

Related U.S. Application Data

(60) Continuation of application No. 14/831,908, filed on Aug. 21, 2015, now Pat. No. 9,912,363, which is a
(Continued)

(30) Foreign Application Priority Data

Jun. 30, 2011 (JP) ................................ 2011-145782

(51) Int. Cl.
| | |
|---|---|
| *H04W 4/00* | (2018.01) |
| *H04B 1/3822* | (2015.01) |
| *H04W 4/80* | (2018.01) |
| *B60R 25/00* | (2013.01) |
| *H04M 1/725* | (2006.01) |
| *H04M 1/60* | (2006.01) |

(Continued)

(52) U.S. Cl.
CPC ........... *H04B 1/3822* (2013.01); *B60R 25/00* (2013.01); *H04M 1/6091* (2013.01);
(Continued)

(58) Field of Classification Search
CPC ................................ H04W 4/008; H04W 8/22
See application file for complete search history.

(56) References Cited

U.S. PATENT DOCUMENTS

| 5,666,397 A | 9/1997 | Lamons et al. |
| 2007/0238475 A1 | 10/2007 | Goedken |

(Continued)

FOREIGN PATENT DOCUMENTS

| JP | 2001-077855 A | 3/2001 |
| JP | 2006-352522 A | 12/2006 |

(Continued)

OTHER PUBLICATIONS

Office Action dated Jul. 9, 2013 in Japanese Application No. 2011-145783 (with English translation) corresponding to co-pending U.S. Appl. No. 13/535,765.

*Primary Examiner* — Omoniyi Obayanju
(74) *Attorney, Agent, or Firm* — Harness, Dickey & Pierce, P.L.C.

(57) ABSTRACT

A short-range wireless communication apparatus is disclosed. The short-range wireless communication apparatus comprises: multiple connection devices and a control device. The connection devices are capable of simultaneously connecting multiple communication interfaces to a communication counterparty apparatus to enable sound data transfer. When the control device determines that, in cases where the communication interfaces are communicably connected, there arises a request to start outputting the sound data transferred by one of the communication interfaces, the control device disconnects another one of the communication interfaces while keeping the one of the communication interfaces connected and causes a sound data output device to output the sound data transferred from the communication counterparty apparatus by the one of the communication interfaces.

6 Claims, 16 Drawing Sheets

Related U.S. Application Data division of application No. 14/283,353, filed on May 21, 2014, now Pat. No. 9,154,905, which is a continuation of application No. 13/535,937, filed on Jun. 28, 2012, now Pat. No. 8,811,966.

(51) Int. Cl.
*H04W 4/40* (2018.01)
*H04W 84/10* (2009.01)

(52) U.S. Cl.
CPC ............ *H04M 1/7253* (2013.01); *H04W 4/40* (2018.02); *H04W 4/80* (2018.02); *H04W 84/10* (2013.01)

(56) References Cited

U.S. PATENT DOCUMENTS

| | | |
|---|---|---|
| 2008/0269961 A1 | 10/2008 | Shitanaka et al. |
| 2009/0032581 A1 | 2/2009 | Esslinger et al. |
| 2009/0061769 A1* | 3/2009 | Zimbric .............. H04M 1/7253 455/41.2 |
| 2009/0191925 A1 | 7/2009 | Moseler et al. |
| 2009/0239470 A1 | 9/2009 | Sherman |
| 2011/0167182 A1 | 7/2011 | Palin et al. |
| 2011/0237191 A1 | 9/2011 | Saito et al. |
| 2012/0069827 A1 | 3/2012 | Lee et al. |
| 2013/0145057 A1* | 6/2013 | Rathi .................. G06F 13/4286 710/38 |

FOREIGN PATENT DOCUMENTS

| | | |
|---|---|---|
| JP | 2006352799 A | 12/2006 |
| JP | 2008-273370 A | 11/2008 |
| JP | 2009-092428 A | 4/2009 |
| JP | 2009-124463 A | 6/2009 |
| JP | 2010-010876 A | 1/2010 |
| JP | 2011-018975 A | 1/2011 |
| WO | WO-2011004576 A1 | 1/2011 |

* cited by examiner

FIG. 16

IN CASES WHERE USB LINE WAS MADE CONNECTED BEFORE A2DP/AVRCP WAS

| | SOUND OUTPUT BY USB LINE IMMEDIATELY BEFORE LAST-POWER-OFF | SOUND OUTPUT BY A2DP/AVRCP IMMEDIATELY BEFORE LAST-POWER-OFF |
|---|---|---|
| ORDINARY TYPE APPARATUS | USB LINE → KEPT CONNECTED A2DP/AVRCP → KEPT CONNECTED (SEE FIG. 10) | USB LINE → KEPT CONNECTED A2DP/AVRCP → KEPT CONNECTED (SEE FIG. 11) |
| LATER-CONNECT I/F PRIORITY TYPE APPARATUS | USB LINE → KEPT CONNECTED A2DP/AVRCP → DISCONNECT (SEE FIG. 12) | USB LINE → KEPT CONNECTED A2DP/AVRCP → KEPT CONNECTED (SEE FIG. 13) |
| EARLIER-CONNECT I/F PRIORITY TYPE APPARATUS | USB LINE → KEPT CONNECTED A2DP/AVRCP → KEPT CONNECTED (SEE FIG. 14) | USB LINE → DISCONNECT A2DP/AVRCP → KEPT CONNECTED (SEE FIG. 15) |

FIG. 17

IN CASES WHERE A2DP/AVRCP WAS MADE CONNECTED BEFORE USB LINE WAS

| | SOUND OUTPUT BY USB LINE IMMEDIATELY BEFORE LAST-POWER-OFF | SOUND OUTPUT BY A2DP/AVRCP IMMEDIATELY BEFORE LAST-POWER-OFF |
|---|---|---|
| ORDINARY TYPE APPARATUS | USB LINE → KEPT CONNECTED A2DP/AVRCP → KEPT CONNECTED | USB LINE → KEPT CONNECTED A2DP/AVRCP → KEPT CONNECTED |
| LATER-CONNECT I/F PRIORITY TYPE APPARATUS | USB LINE → KEPT CONNECTED A2DP/AVRCP → KEPT CONNECTED | USB LINE → DISCONNECT A2DP/AVRCP → KEPT CONNECTED |
| EARLIER-CONNECT I/F PRIORITY TYPE APPARATUS | USB LINE → KEPT CONNECTED A2DP/AVRCP → DISCONNECT | USB LINE → KEPT CONNECTED A2DP/AVRCP → KEPT CONNECTED |

SHORT-RANGE WIRELESS COMMUNICATION APPARATUS

CROSS REFERENCE TO RELATED APPLICATION

This application is a continuation application of U.S. patent application Ser. No. 14/831,908 filed on Aug. 21, 2015 which is a divisional application of U.S. patent application Ser. No. 14/283,353 filed on May 21, 2014, now U.S. Pat. No. 9,154,905, issued Oct. 6, 2015, which is a continuation application of U.S. patent application Ser. No. 13/535,937 filed on Jun. 28, 2012, now U.S. Pat. No. 8,811,966, issued Aug. 19, 2014, which is based on and claims priority to Japanese Patent Application No. 2011-145782 filed on Jun. 30, 2011. The entire disclosures of each of the above applications are incorporated herein by reference.

TECHNICAL FIELD

The present disclosure relates to a short-range wireless communication apparatus that can simultaneously connect multiple communication interfaces to a communication counterparty apparatus and that includes multiple connection devices for sound data transmission from the communication counterparty apparatus by the multiple communication interfaces.

BACKGROUND

A short-range wireless communication apparatus having a short-range wireless communication function can connect a short-range wireless communication line to a communication counterparty apparatus which is, for example, a mobile phone. By connecting a sound data transfer protocol defining sound data transfer with the communication counterparty apparatus, the short-range wireless communication apparatus receives the sound data transferred from the communication counterparty apparatus based on the sound data transfer protocol and outputs sound from a speaker. JP-2008-273370A (US 2008/0269961A) discloses that Advanced Audio Distribution Profile (A2DP) and Audio/Video Remote Control Profile (AVRCP), respectively, are a sound data transfer protocol defining sound data transfer and a control data transfer protocol defining control data transfer relating to sound data control according to the Bluetooth (registered trademark) communication standards.

In this relation, the inventor of the present application has found out the following. A conceivable system is that there are multiple communication interfaces between a short-range wireless communication apparatus and a communication counterparty apparatus. In such a system, the multiple communication interfaces (e.g., transmission medium such as data communication protocols and communication lines) enabling sound data transfer are simultaneously connected between a short-range wireless communication apparatus and a communication counterparty apparatus. In this case, when the multiple communication interfaces provides different functions, a user may wish to transfer sound data from the communication counterparty apparatus by his or her desired communication interface by selecting it from the multiple communication interfaces. However, depending on the specifications of the communication counterparty apparatus, when multiple communication interfaces are simultaneously connected between the short-range wireless communication apparatus and the communication counterparty apparatus, the simultaneously-connected multiple communication interface prevents the communication counterparty apparatus from appropriately transferring the sound data.

SUMMARY

The present disclosure is made in view of the foregoing. It is an object of the present disclosure to provide a short-range wireless communication apparatus which can simultaneously connect multiple communication interfaces to a communication counterparty apparatus and which enables appropriate sound transfer from the communication counterparty apparatus by one of the multiple communication interfaces.

According to a first example of the present disclosure, a short-range wireless communication apparatus comprises multiple connection devices and a control device. The multiple connection devices are capable of simultaneously connecting a plurality of communication interfaces to a communication counterparty apparatus. The multiple connection devices cause transfer of sound data from the communication counterparty apparatus by the communication interfaces. The control device is configured to cause a sound data output device to selectively output the sound data transferred from the communication counterparty apparatus to any of the connection devices by any of the communication interfaces. When the control device determines that, in cases where the communication interfaces are communicably connected, there arises a request to start outputting the sound data transferred by one of the communication interfaces, the control device disconnects another one of the communication interfaces while keeping the one of the communication interfaces connected and causes the sound data output device to output the sound data that is transferred from the communication counterparty apparatus by the one of the communication interfaces.

A short-range wireless communication apparatus comprising:

According to the above configuration, even if the communication counterparty apparatus is designed to be incapable of appropriately transfer the sound data due to the simultaneously-connected multiple communication interfaces between the short-range wireless communication apparatus and the communication counterparty apparatus, the short-range wireless communication apparatus can cause the communication counterparty apparatus to appropriately transfer the sound data by disconnecting the another one of the communication interfaces while maintaining the connection of the one of the communication interfaces associated with the sound data output start request.

According to a second example of the present disclosure, a short-range wireless communication apparatus comprises multiple connection devices and a control device. The multiple connection devices are capable of simultaneously connecting a plurality of communication interfaces to a communication counterparty apparatus. The multiple connection devices cause transfer of sound data from the communication counterparty apparatus by the communication interfaces. The control device is configured to cause a sound data output device to selectively output the sound data transferred from the communication counterparty apparatus to any of the connection devices by any of the communication interfaces. When the control device determines that, in cases where one of the communication interfaces is not communicably connected and another one of the communication interfaces is communicably connected, there arises a request to start outputting the sound data transferred by the one of the communication interfaces, the control device disconnects the another one of the communication interfaces and thereafter connects the one of the communication interfaces and causes the sound data output device to output the sound data that is transferred from the communication counterparty apparatus by the one of the communication interfaces.

According to the above configuration, even if the communication counterparty apparatus is designed to be incapable of appropriately transfer the sound data due to the simultaneously-connected multiple communication interfaces between the short-range wireless communication apparatus and the communication counterparty apparatus, the short-range wireless communication apparatus can cause the communication counterparty apparatus to appropriately transfer the sound data by disconnecting the another one of the communication interfaces and thereafter connecting the one of the communication interfaces.

BRIEF DESCRIPTION OF THE DRAWINGS

The above and other objects, features and advantages of the present disclosure will become more apparent from the following detailed description made with reference to the accompanying drawings. In the drawings:

FIG. 16 is a diagram illustrating how to connect and disconnect communication interfaces in cases where USB communication line is connected before A2DP/AVRCP is connected;

FIG. 17 is a diagram illustrating how to connect and disconnect communication interfaces in cases where USB communication line is connected before A2DP/AVRCP is connected.

DETAILED DESCRIPTION

A BT-compatible in-vehicle apparatus having a Bluetooth (registered trademark) communication function (Bluetooth is also referred to herein as "BT") will be described with reference to drawings. In one embodiment, it is assumed that a BT-compatible mobile phone having a BT communication function is carried in a compartment the vehicle equipped with the in-vehicle apparatus, and that the in-vehicle apparatus and the mobile phone are in a BT communication performable state.

Figure 1:
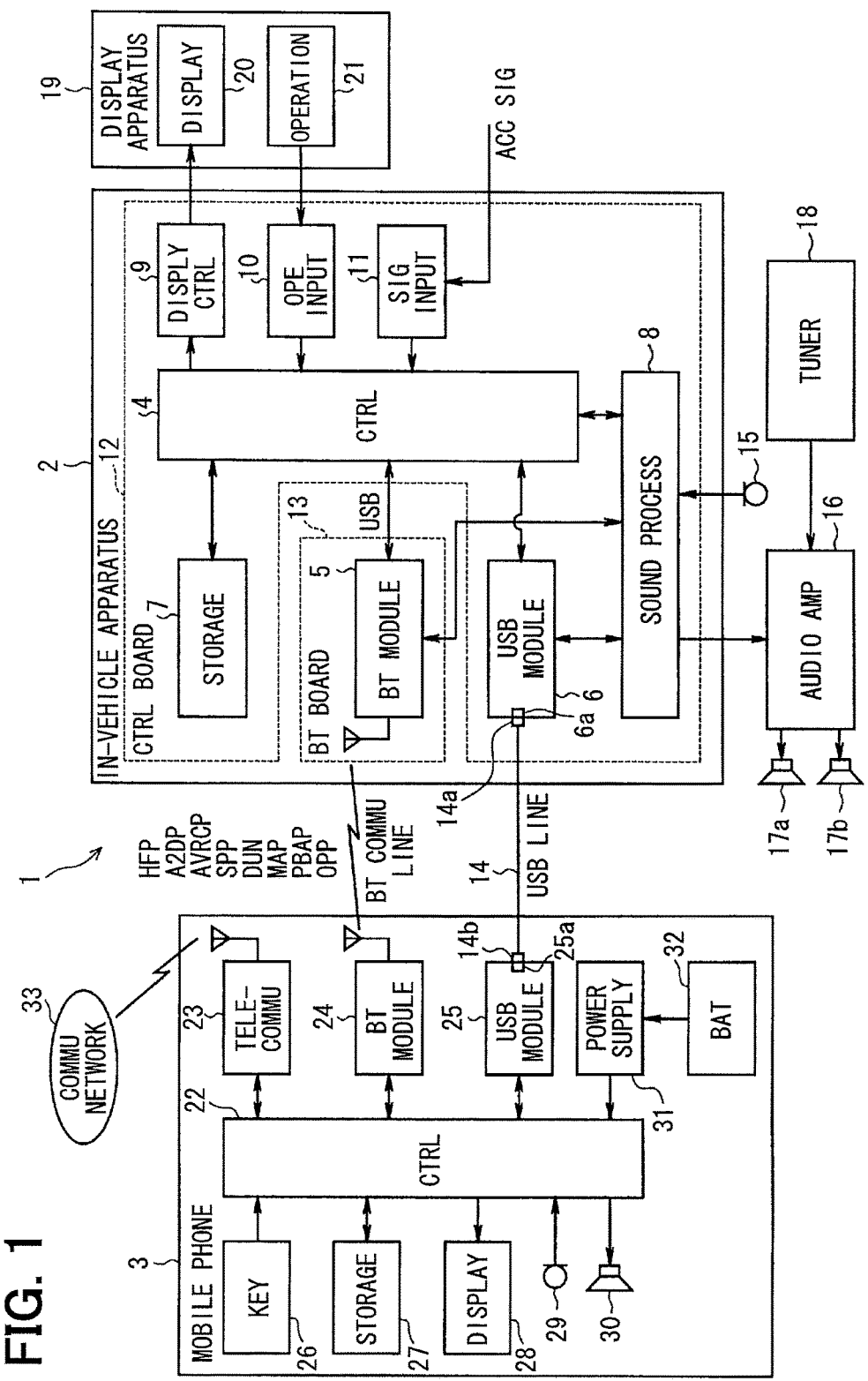
FIG. 1 is a functional block diagram illustrating a BT communication system of one embodiment.

As shown in FIG. 1, a BT communication system 1 includes an in-vehicle apparatus 2 (corresponding to a short-range wireless communication apparatus) mounted in a vehicle, and a mobile phone 3 (corresponding to a communication counterparty apparatus) carried in the compartment the vehicle. The in-vehicle apparatus 2 includes a control section 4 (corresponding to a control means and a control device), a BT module 5 (corresponding to a connection means and a connection device), a Universal Serial Bus (USB) module 6 (corresponding to a connection means and a connection device), a storage section 7, a voice processing section 8, a display control section 9, an operator input section 10, and a signal input section 11. The control section 4, the USB module 6, the storage section 7, the voice processing section 8, the display control section 9, the operator input section 10, and the signal input section 11 are physically mounted on a control board 12. The BT module 5 is physically mounted on a BT module board 13 different from the control board 12. The control section 4 and the BT module 5 may be connected to each other by a USB.

The control section 4 may include a microcomputer with a CPU, a RAM, a ROM and an I/O bus and controls generally all operations of the in-vehicle apparatus 2, including communication operation and data management operation.

The BT module 5 has functions to connect a BT communication line to a BT module of the mobile phone 3 and performs BT communication with the mobile phone 3 by the BT communication line. The BT module 5 is configured to be capable of simultaneously connecting multiple profiles defined by the BT communication standard (i.e. to achieve so-called multi-connection). The multiple profiles include Hands Free Profile (HFP) defining hands-free communication, Advanced Audio Distribution Profile (A2DP) defining sound data transfer, Audio/Video Remote Control Profile (AVRCP) defining control data transfer for sound data control, Serial Port Profile (SPP) defining data communication using a virtual serial port, Dial-up Networking Profile (DUN) defining dial-up Internet connection, Message Access Profile (MAP) defining e-mail data transfer, Phone Book Access Profile (PBAP) defining phone book data transfer, and Object Push Profile (OPP) also defining phone book data transfer. The HFP, A2DP, AVRCP, SPP, DUN, MAP, PBAP, and OPP are data communication protocols defined on a function basis. By connecting A2DP and AVRCP between the BT module 5 of the in-vehicle apparatus 2 and the BT module of the mobile phone 3, sound data can be transferred between the BT module 5 of the in-vehicle apparatus 2 and the BT module of the mobile phone 3. A2DP and AVRCP corresponds to a communication interface.

The USB module 6 includes a connection terminal 6a, which is detachably connectable to a connection terminal 14a of a USB connection cable 14 c. When the connection terminal 14a of the USB connection cable 14 is connected to the connection terminal 6a and when the other connection terminal 14b of the USB connection cable 14 is connected to a connection terminal of the USB module of the mobile phone 3, the USB module 6 can connect a USB communication line to the USB module of the mobile phone 3, and can perform USB communication with the mobile phone 3 by the USB communication line. When connecting the USB communication line (USB application), the USB module 6 of the in-vehicle apparatus 2 and the USB module of the mobile phone 3 can transfer the sound data therebetween using the USB communication line. Like the foregoing A2DP and AVRCP, the USB communication line also corresponds to a communication interface.

The storage section 7 has a storage area for storing various kinds of data. When the BT module 5 connects MAP to the BT module of the mobile phone 3, e-mail data may be transferred from the mobile phone 3 to the BT module 5 and may be stored in the storage section 7. The e-mail data may include addresser information for identifying the e-mail sender, receipt date/time information for identifying the date and time when the e-mail was received at the mobile phone 3, and/or type information for identifying the type of the e-mail. The type information may be, for example, information for identifying the e-mail subject inputted by the sender. Also, when the BT module 5 connects PBAP to the BT module of the mobile phone 3, phone book data, outgoing call history data, incoming call history data and/or the like may be transferred from the mobile phone 3 to the BT module 5, and may be stored in the storage section 7. The outgoing call history data indicates correspondence between outgoing call time destination's phone number for each outgoing call made from (i) the in-vehicle apparatus 2 or (ii) the mobile phone 3 that is connected with the in-vehicle apparatus 2 by HFP. The incoming call history data indicates correspondence between caller's phone number and incoming call receipt time for each incoming call received by the mobile phone 3 that is connected, by HFP, with the in-vehicle apparatus 2.

The voice processing section 8 is connected with a microphone 15 and an audio amplifier 16. The microphone 15 is disposed in the vehicle compartment and is installed at a place where the voice uttered by the user can be easily collected. For example, the microphone 15 may be placed near the steering wheel. The audio amplifier 16 is external to the in-vehicle apparatus 2. The audio amplifier 16 is connected with speaker 17a, 17b (corresponding to a sound data output means and a sound data output device).

When the HFP is connected between the BT module 5 and the BT module of the mobile phone 3, the user may utter voice to input an outgoing call voice data to the microphone 15. In this case, the voice processing section 8 processes the inputted voice data, then outputs the processed voice data to the BT module 5. When an incoming call voice data is inputted to the BT module 5, the voice processing section 8 outputs the incoming call voice data to the audio amplifier 16.

When A2DP and AVRCP are connected between the BT module 5 and the BT module of the mobile phone 3, the sound data may be transferred from the BT module of the mobile phone 3 to the BT module 5 using A2DP and AVRCP. In this case, the voice processing section 8 outputs the transferred sound data to the audio amplifier 16. When USB communication is performable between the USB module 6 and the USB module of the mobile phone 3, the sound data may be transferred from the USB module of the mobile phone 3 to the USB module 6 by the USB communication line. In this case, the voice processing section 8 outputs the transferred sound data to the audio amplifier 16.

When receiving the incoming call voice data or the sound data from the voice processing section 8, the audio amplifier 16 amplifies the inputted voice data or sound data and outputs the amplified voice data or sound data from speaker 17a, 17b. The audio amplifier 16 is also connected with a tuner deck 18. When the tuner deck 18 plays music data from, for example, a music recording medium, the audio amplifier 16 amplifies the music data and outputs the amplified music data from the speaker 17a, 17b.

A display apparatus 19 includes a display unit 20 for displaying various display screens and an operation unit 21 for forming touch switches on a display screen. When receiving a display command signal from the control section 4, the display control section 9 controls display operation of the display unit 20 of the display apparatus 19 based on the inputted display command signal. When a touch switch formed on a display screen is operated by the user, a corresponding operation detection signal is inputted from the operation unit 21 to the operator input section 10. The operator input section 10 then outputs the operation detection signal to the control section 4. The control section 4 analyzes the operation detection signal received from the operator input section 10 and determines the operation performed by the user.

The signal input section 11 is connected to an accessory (ACC) switch mounted to the vehicle. When an ACC signal outputted from the ACC switch is inputted, the signal input section 11 outputs the inputted ACC signal to the control section 4. The control section 4 controls the turning on/off of the apparatus power supply based on the turning on/off of the ACC signal inputted from the signal input section 11. Namely, the control section 4 turns the apparatus power supply on (turning the in-vehicle apparatus 2 on) when the ACC signal turns on and turns the apparatus power supply off (turning the in-vehicle apparatus 2 off) when the ACC signal turns off.

The mobile phone 3 includes a control section 22, a telephone communication section 23, a BT module 24, a USB module 25, a keying section 26, a storage section 27, a display section 28, a microphone 29, a speaker 30, and a power supply section 31.

The control section 22 may include a microcomputer with a CPU, a RAM, a ROM, and an I/O bus and controls generally all operations of the mobile phone 3, including communication operation and data management operation. The telephone communication section 23 performs telephone communication with a communication network 33. The communication network 33 includes equipment, such as a mobile phone base station and a base station control apparatus, for providing mobile telephone communication services. The BT module 24 has a function to connect a BT communication line to the BT module 5 of the in-vehicle apparatus 2 and perform BT communication by the BT communication line. The BT module 24 is configured to be capable of simultaneously connecting multiple profiles defined by the BT communication standard such as HFP, A2DP, AVRCP, SPP, DUN, MAP, PBAP, and OPP.

The USB module 25 includes a connection terminal 25a, which is detachably connectable to the connection terminal 14b of the USB connection cable 14. When the connection terminal 14a of the USB connection cable 14 is connected to the connection terminal 6a of the USB module 6 of the in-vehicle apparatus 2 and the other connection terminal, 14b, of the USB connection cable 14 is connected to the connection terminal 25a, the USB module 25 can connect a USB communication line to the USB module 6 of the in-vehicle apparatus 2 and perform USB communication with the in-vehicle apparatus 2 by the USB communication line.

The keying section 26 includes various keys operable by the user. When a key is operated by the user, a corresponding operation detection signal is outputted from the keying section 26 to the control section 22. The control section 22 then analyzes the inputted operation detection signal and determines the operation performed by the user. The storage section 27 has a storage area for storing various kinds of data. When a display command signal is received from the control section 22, the display control section 28 displays a display screen based on the display command signal. Also, when voice uttered by the user is received as outgoing call voice data from the microphone 29, the control section 22 processes the outgoing call voice data. When an incoming call voice data is inputted from the telephone communication section 23, the control section 22 outputs the incoming call voice data as voice from the speaker 30. The power supply section 31 supplies the power, which is from a detachable battery 32, as operating power to various function blocks.

In the above configuration, after connecting a BT communication line between the BT module 5 and the BT module 24, the control section 4 first automatically connects HFP between the BT module 5 and the BT module 24 (without requiring user operation). After finishing connecting HFP, the control section 4 automatically connects A2DP between the BT module 5 and the BT module 24. After finishing connecting A2DP, the control section 4 automatically connects AVRCP between the BT module 5 and the BT module 24. After finishing connecting AVRCP, the control section 4 automatically connects PBAP between the BT module 5 and the BT module 24. Then, with HFP, A2DP and AVRCP connected between the BT module 5 and the BT module 24, the control section 4 starts data communication (phone book data transfer) using PBAP. Subsequently, when the control section 4 determines that the data communication performed using PBAP has ended, the control section 4 disconnects PBAP between the BT module 5 and the BT module 24 while keeping HFP, A2DP and AVRCP connected.

When the USB communication line is connected between the USB module 6 and the USB module 25 while A2DP and AVRCP are being connected between the BT module 5 and the BT module 24, the mobile phone 3 acting as a communication counterparty of the in-vehicle apparatus 2 has two communication interfaces for transmitting (transferring) the sound data to the in-vehicle apparatus 2, one being a USB communication line and the other being A2DP and AVRCP. The sound data transmitted from the mobile phone 3 to the in-vehicle apparatus 2 may be, for example, music data played with use of a music play function of the mobile phone 3.

Upon receipt of a sound data output start request command, which requests start of sound data output, from the in-vehicle apparatus 2, the mobile phone 3 transmits sound data to the in-vehicle apparatus 2. In cases where the two communication interfaces, e.g., the USB communication line and the A2DP and AVRCP, are usable in sound data transmission, there are many ways for the mobile phone 3 to transmit the sound data. In term of sound data transmission way, the mobile phone can be classified into the following three types according to apparatus' specifications as to which communication interface is used to transmit the sound data.

(a) An ordinary type apparatus, which is allowed to transmit the sound data by using any one of the USB communication line and the A2DP/AVRCP when the USB communication line and the A2DP/AVRCP are connected. This ordinary type apparatus is also called herein an ordinary apparatus.

(b) A later-connected interface priority type apparatus (a special type apparatus placing priority on a later-connected communication interface), which is allowed to transmit the sound data by using only the later-connected (last-connected) one of the two communication interfaces (the USB communication line and the A2DP/AVRCP) when the USB communication line and the A2DP/AVRCP are connected. The later-connected interface priority type apparatus is also called a later-connected interface priority apparatus.

(c) An earlier-connected interface priority type apparatus (a special type apparatus placing priority on an earlier-connected communication interface), which is allowed to transmit the sound data by using only the earlier-connected one (first-connected one) of the two communication interfaces (the USB communication line and the A2DP/AVRCP) when the USB communication line and the A2DP/AVRCP are connected. The earlier-connected interface priority type apparatus is also called an earlier-connected interface priority apparatus.

Namely, in the ordinary type apparatus, the communication interface usable to transmit the sound data does not depend on an order in which the communication interfaces are connected. In the later-connected interface priority type apparatus and the earlier-connected interface priority type apparatus, the communication interface usable to transmit the sound data depends on the order in which the communication interfaces are connected.

Next, the operations of the BT communication system 1 will be described with reference to FIGS. 2 to 18. FIGS. 2 to 9 are flowcharts illustrating processings performed by the control section 4 of the in-vehicle apparatus 2.

When the in-vehicle apparatus 2 is in a powered state (with an ACC switch on), the control section 4 performs a main processing. Sub-processings of the main processing include a communication interface connection processing, a last-used communication interface check processing, a USB communication line connection check processing, an A2DP/AVRCP-based sound data output start request check processing, a USB-communication-line-based sound data output start request check processing, a A2DP/AVRCP-based sound data output end request check processing, a USBcommunication-line-based sound data output end request check processing. These processings will be described in order below.

Figure 2:
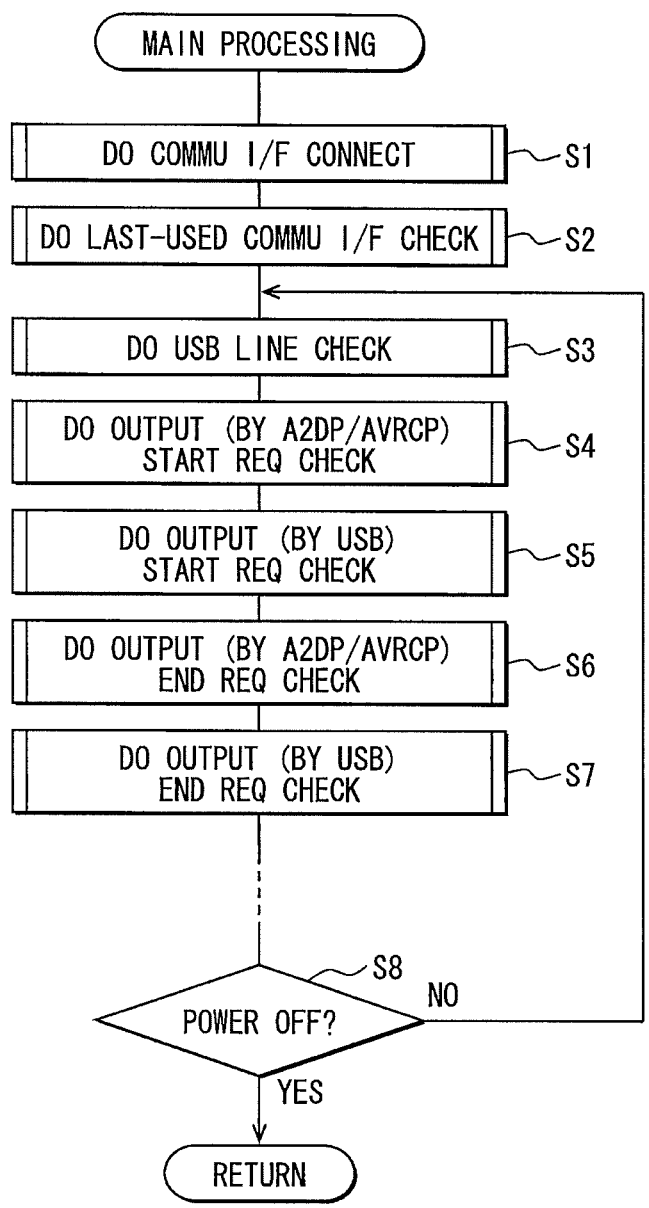
FIG. 2 is a flowchart illustrating a main processing performed by an in-vehicle apparatus.

(1) Main Processing (See FIG. 2)

Upon determining that the in-vehicle apparatus 2 has been powered on, the control section 4 starts the main processing. In the main processing, the communication interface connection processing and the last-used communication interface check processing are performed only once immediately after the in-vehicle apparatus 2 is powered on. Subsequently, the USB communication line connection check processing, the A2DP/AVRCP-based sound data output start request check processing, the USB-communication-line-based sound data output start request check processing, the A2DP/AVRCP-based sound data output end request check processing, and the USB-communication-line-based sound data output end request check processing are periodically performed at predetermined intervals until the control section 4 determines that the in-vehicle apparatus 2 has been powered off (steps S1 to S8).

Figure 3:
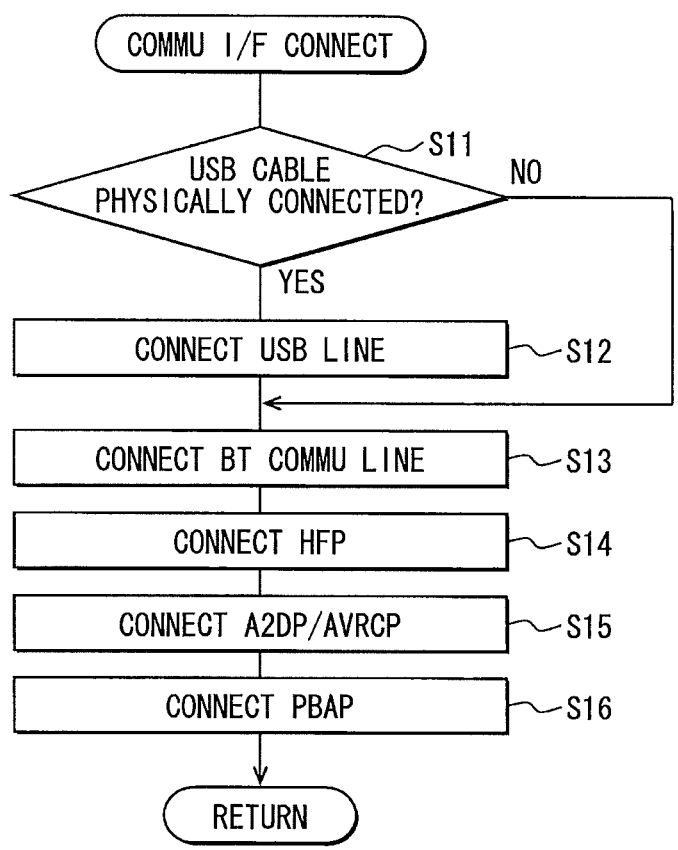
FIG. 3 is a flowchart illustrating a communication interface connection processing.

(2) Communication Interface Connection Processing (See FIG. 3)

After entering the communication interface connection processing from the main processing, the control section 4 first determines whether or not the USB connection cable 14 is physically connected between the in-vehicle apparatus 2 and the mobile phone 3 (step S11). When the connection terminal 14a of the USB connection cable 14 has been already connected by the user to the connection terminal 6a of the USB module 6 of the in-vehicle apparatus 2 and the other connection terminal 14b of the USB connection cable 14 has also been already connected by the user to the connection terminal 25a of the USB module 25 of the mobile phone 3, the control section 4 determines that the USB connection cable 14 is physically connected between the in-vehicle apparatus 2 and the mobile phone 3 (step S11=YES). Then, the control section 4 causes a USB communication line to be connected between the USB module 6 and the USB module 25, thereby enabling USB communication (step S12). In this case, connecting the USB communication line between the USB module 6 and the USB module 25 refers to not physically connecting the USB communication line but it refers to logically connecting (by software) the USB communication line to enable USB communication.

After connecting the USB communication line between the USB module 6 and the USB module 25, the control section 4 connects a BT communication line between the BT module 5 and the BT module 24 (step S13). Subsequently, the control section 4 connects HFP between the BT module 5 and the BT module 24 (step S14), A2DP/AVRCP between the BT module 5 and the BT module 24 (step S15), and PBAP between the BT module 5 and the BT module 24 (step S16). The control section 4 then ends the communication interface connection processing and returns to the main processing.

When the control section 4 determines that the USB connection cable 14 is not physically connected between the in-vehicle apparatus 2 and the mobile phone 3 (step S11=NO), the control section 4 connects a BT communication line between the BT module 5 and the BT module 24 (step S13) without connecting they USB communication line between the USB module 6 and the USB module 25. Subsequently, the control section 24 connects HFP (step S14), A2DP/AVRCP (step S15), and PBAP (step S16) between the BT module 5 and the BT module 24. The control section 4 then ends the communication interface connection processing and returns to the main processing.

Figure 4:
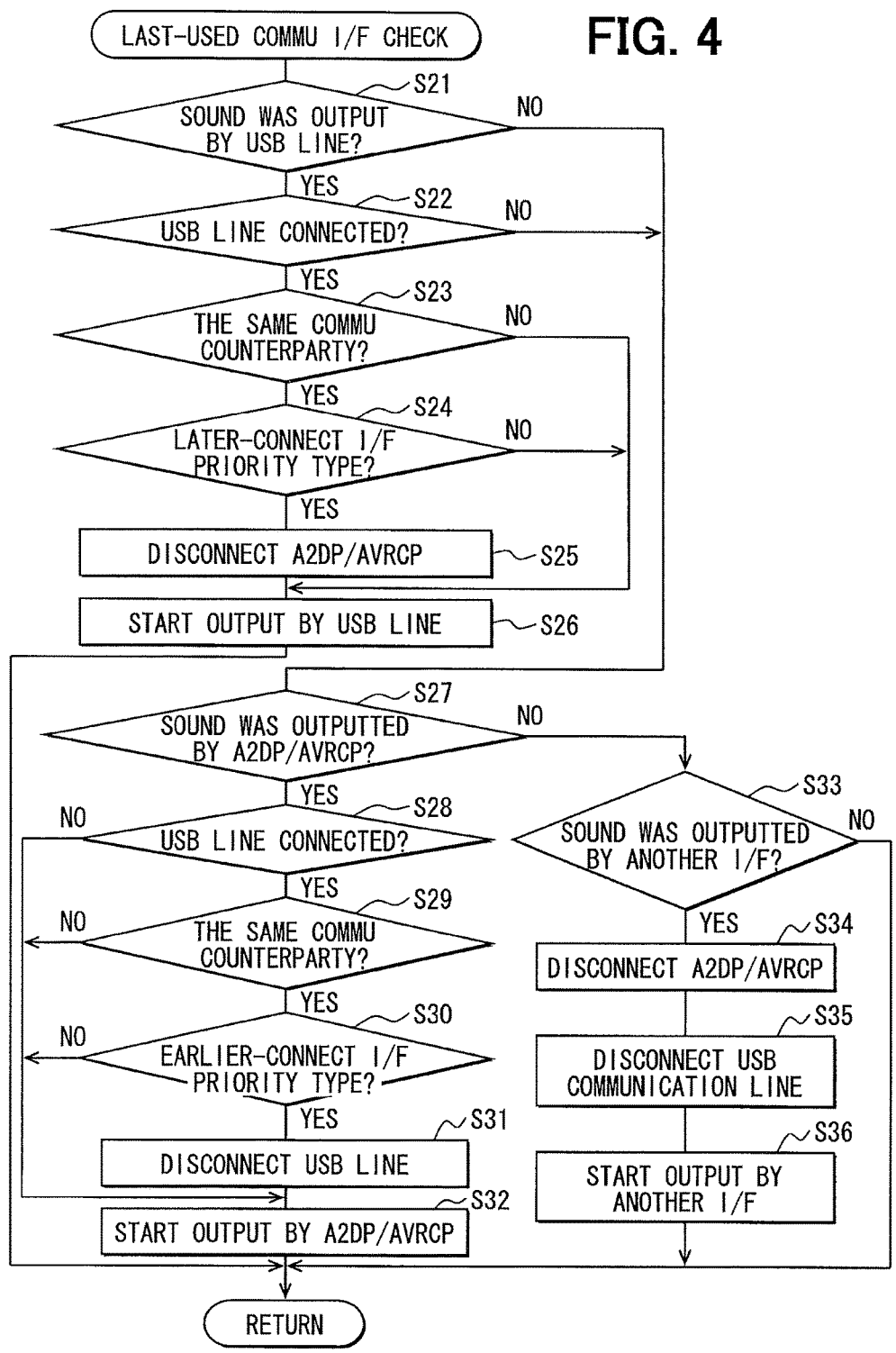
FIG. 4 is a flowchart illustrating a last-used communication interface check processing.

(3) Last-Used Communication Interface Check Processing (See FIG. 4)

After entering the last-used communication interface check processing from the main processing, the control section 4 first determines whether or not the sound data transmitted from the USB module 25 to the USB module 6 by the USB communication line had been outputted immediately before the in-vehicle apparatus 2 was last powered off (the ACC switch off) (step S21).

When the control section 4 determines that the sound data transmitted by the USB communication line had been outputted immediately before the in-vehicle apparatus 2 was last powered off (step S21=YES), the control section 4 determines whether or not the USB communication line is connected (step S22). Specifically, at step S22 the control section 4 determines whether both the USB communication line and the A2DP/AVRCP are concurrently connected and whether the USB communication line was made connected earlier and thereafter the A2DP/AVRCP was made connected later (step S22).

When the control section 4 determines that the USB communication line is connected, specifically, When the control section 4 determines that the USB communication line and the A2DP/AVRCP both are concurrently connected and that the USB communication line was made connected earlier than the A2DP/AVRCP was (step S22=YES), the processing proceeds to step S23. At step S23, the control section 4 determines whether or not the communication counterparty apparatus to which the USB module 6 is connected by the USB communication line is the same as the communication counterparty apparatus to which the BT module 5 is connected by A2DP/AVRCP. This determination may be made, for example, by comparing the identification information (for example, apparatus identification information identifying the mobile phone 3) received from the USB module 25 when the USB communication line was made connected and the identification information (for example, apparatus identification information identifying the mobile phone 3) received from the BT module 24 when the BT communication line was made connected.

In this case, when the communication counterparty apparatus to which the USB module 6 is connected by the USB communication line is the same as the communication counterparty apparatus to which the BT module 5 is connected by A2DP/AVRCP, the identification information received from the USB module 25 and the identification information received from the BT module 24 matches each other. When the communication counterparty apparatus to which the USB module 6 is connected by the USB communication line differs from the communication counterparty apparatus to which the BT module 5 is connected by A2DP/AVRCP, the identification information received from the USB module 25 and the identification information received from the BT module 24 does not match each other.

When the control section 4 determines that the identification information received from the USB module 25 and the identification information received from the BT module 24 matches each other, specifically, when the control section 4 determines that the communication counterparty apparatus to which the USB module 6 is connected by the USB communication line is the same as the communication counterparty apparatus to which the BT module 5 is connected by A2DP/AVRCP (step S23=YES), the processing proceeds to step S24. At step S24, the control section 4 determines whether or not the communication counterparty apparatus is the later-connected interface priority type apparatus, which is a apparatus allowed to transmit the sound data by using only the later-connected (last-connected) communication interface when the multiple communication interfaces each enabling sound data transmission are connected. This determination S24 may be made, for example, based on the identification information received from the USB module 25 when the USB communication line was connected or the identification information received from the BT module 24 when the BT communication line was connected. When the control section 4 determines that the communication counterparty apparatus is the later-connected interface priority type apparatus (step S24=YES), the control section 4 disconnects the A2DP/AVRCP (A2DP and AVRCP) connected between the BT module 5 and the BT module 24 (step S25).

When the A2DP/AVRCP connected between the BT module 5 and the BT module 24 is disconnected, the USB communication line connected between the USB module 25 and the USB module 6 becomes the only communication interface that the mobile phone 3 can use to transmit sound data to the in-vehicle apparatus 2. The control section 4 transmits a sound data output start request command from the USB module 6 to the USB module 25 (step S26). Because of this, sound data transmission from the USB module 25 to the USB module 6 by the USB communication line stars, and additionally, the sound outputs from the speaker 17a, 17b. Subsequently, the control section 4 ends the last-used communication interface check processing and returns to the main processing.

When the control section 4 determines that the communication counterparty apparatus to which the USB module 6 is connected by the USB communication line differs from the communication counterparty apparatus to which the BT module 5 is connected by A2DP/AVRCP (step S23=NO) or when the control section 4 determines that the communication counterparty apparatus is not the later-connected interface priority type apparatus (step S24=NO), the processing proceeds to step S26. At step S26, the control section 4 transmits the sound data output start request command from the USB module 6 to the USB module 25 without disconnecting the A2DP/AVRCP between the BT module 5 and the BT module 24. Because of this, the sound data transmission from the USB module 25 to the USB module 6 by the USB communication line starts, and additionally, the sound outputs from the speaker 17a, 17b. Subsequently, the control section 4 ends the last-used communication interface check processing and returns to the main processing.

When the control section 4 determines that immediately before the in-vehicle apparatus 2 was last powered off, the sound data transmitted by a USB communication line had not been outputted (step S21=NO), the processing proceeds to step S27. At step S27, the control section 4 determines whether or not the sound data transmitted from the BT module 24 to the BT module 5 by A2DP/AVRCP had been outputted immediately before the in-vehicle apparatus 2 was last powered off (step S27).

When the control section 4 determines that the sound data transmitted by A2DP/AVRCP had been outputted immediately before the in-vehicle apparatus 2 was last powered off (step S27=YES), the control section 4 determines whether or not the USB communication line is connected (step S28). Specifically, at step S28, the control section 4 determines whether or not both the USB communication line and the A2DP/AVRCP both are connected, and whether or not the USB communication line was made connected earlier and then the A2DP/AVRCP was made connected later.

When the control section 4 determines that the USB communication line is connected, specifically, when the control section 4 determines that the USB communication line and the A2DP/AVRCP both are connected and that the USB communication line was made connected earlier than the A2DP/AVRCP was (step S28=YES), the processing proceeds to step S29. At step S29, the control section 4 determines whether or not the communication counterparty apparatus to which the USB module 6 is connected by the USB communication line is the same as the communication counterparty apparatus to which the BT module 5 is connected by A2DP/AVRCP.

When the control section 4 determines that the communication counterparty apparatus to which the USB module 6 is connected by the USB communication line is the same as the communication counterparty apparatus to which the BT module 5 is connected by A2DP/AVRCP (step S29=YES), the processing proceeds to step 30. At step S30, the control section 4 determines whether or not the communication counterparty apparatus is the earlier-connected interface priority type apparatus, which is a apparatus allowed to transmit the sound data by using only the earlier-connected communication interface (first-connected communication interface) when multiple communication interfaces each enabling sound data transmission are connected. The determination at S30 may be made, for example, based on the identification information received from the USB module 25 when the USB communication line was connected or the identification information received from the BT module 24 when the BT communication line was connected. When the control section 4 determines that the communication counterparty apparatus is the earlier-connected interface priority type apparatus (step S30=YES), the control section 4 disconnects the USB communication line connected between the USB module 6 and the USB module 25 (in order not to allow USB communication) (step S31). In this case, disconnecting the USB communication line does not refers to physically disconnecting the USB communication line but it refers to logically disconnecting (by software) the USB communication line to prohibit the USB communication.

When the USB communication line connected between the USB module 6 and the USB module 25 is disconnected, the A2DP/AVRCP connected between the BT module 5 and the BT module 24 becomes the only communication interface that the mobile phone 3 can use to transmit sound data to the in-vehicle apparatus 2. The control section 4 transmits a sound data output start request command from the BT module 5 to the BT module 24. Because of this, the sound data transmission from the BT module 24 to the BT module 5 by the A2DP/AVRCP starts, and additionally, the sound outputs from the speaker 17a, 17b (step S32). Subsequently, the control section 4 ends the last-used communication interface check processing and returns to the main processing.

When the control section 4 determines that the USB communication line is not connected between the USB module 6 and the USB module 25 (step S28=NO) or that the communication counterparty apparatus to which the USB module 6 is connected by a USB communication line differs from the communication counterparty apparatus to which the BT module 5 is connected by A2DP/AVRCP (step S29=NO) or that the communication counterparty apparatus is not of the earlier-connected interface priority type apparatus (step S30=NO), the processing proceeds to step S32. At step S32, the control section 4 transmits a sound data output start request command from the BT module 5 to the BT module 24 without disconnecting the USB communication line between the USB module 6 and the USB module 25. Because of this, the sound data transmission from the BT module 24 to the BT module 5 by A2DP/AVRCP starts, and additionally, the sound outputs from the speaker 17a, 17b. Subsequently, the control section 4 ends the last-used communication interface check processing and returns to the main processing.

When the control section 4 determines that immediately before the in-vehicle apparatus 2 was last powered off, the sound data transmitted by A2DP/AVRCP had not been outputted (step S27=NO), the processing proceeds to step S33. At step S33, the control section 4 determines whether or not the sound data had been outputted using another communication interface (step S33). When the control section 4 determines that sound data had been outputted using another communication interface (step S33=YES), the control section 4 disconnects the A2DP/AVRCP connected between the BT module 5 and the BT module 24 (step S34) and the USB communication line connected between the USB module 6 and the USB module 25 (step S35). This causes sound data transmitted by the another communication interface to be outputted from the speaker 17a, 17b (step S36). Subsequently, the control section 4 ends the last-used communication interface check processing and returns to the main processing.

Figure 5:
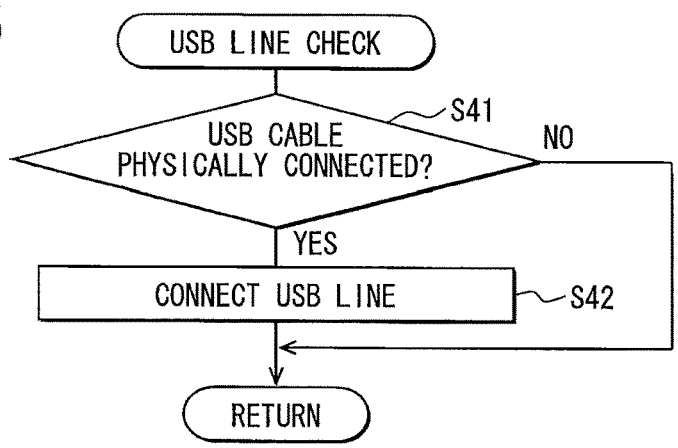
FIG. 5 is a flowchart illustrating USB communication line connection check processing.

(4) USB Communication Line Connection Check Processing (See FIG. 5)

After entering the USB communication line connection check processing from the main processing, the control section 4 first determines whether or not the USB connection cable 14 is physically connected between the in-vehicle apparatus 2 and the mobile phone 3 (step S41). When the connection terminal 14a of the USB connection cable 14 is already connected to the connection terminal 6a of the USB module 6 of the in-vehicle apparatus 2 and the other connection terminal 14b of the USB connection cable 14 is already connected to the connection terminal 25a of the USB module 25 of the mobile phone 3 by the user, the control section 4 determines that the USB connection cable 14 is physically connected between the in-vehicle apparatus 2 and the mobile phone 3 (step S41=YES). Then, the control section 4 causes connect a USB communication line between the USB module 6 and the USB module 25 to enable USB communication (step S42). The control section 4 then ends the USB communication line connection check processing and returns to the main processing. In this case, too, connecting the USB communication line between the USB module 6 and the USB module 25 does not refer to physically connecting the USB communication line but it refers to logically connecting (by software) the USB communication line enabling USB communication.

Figure 6:
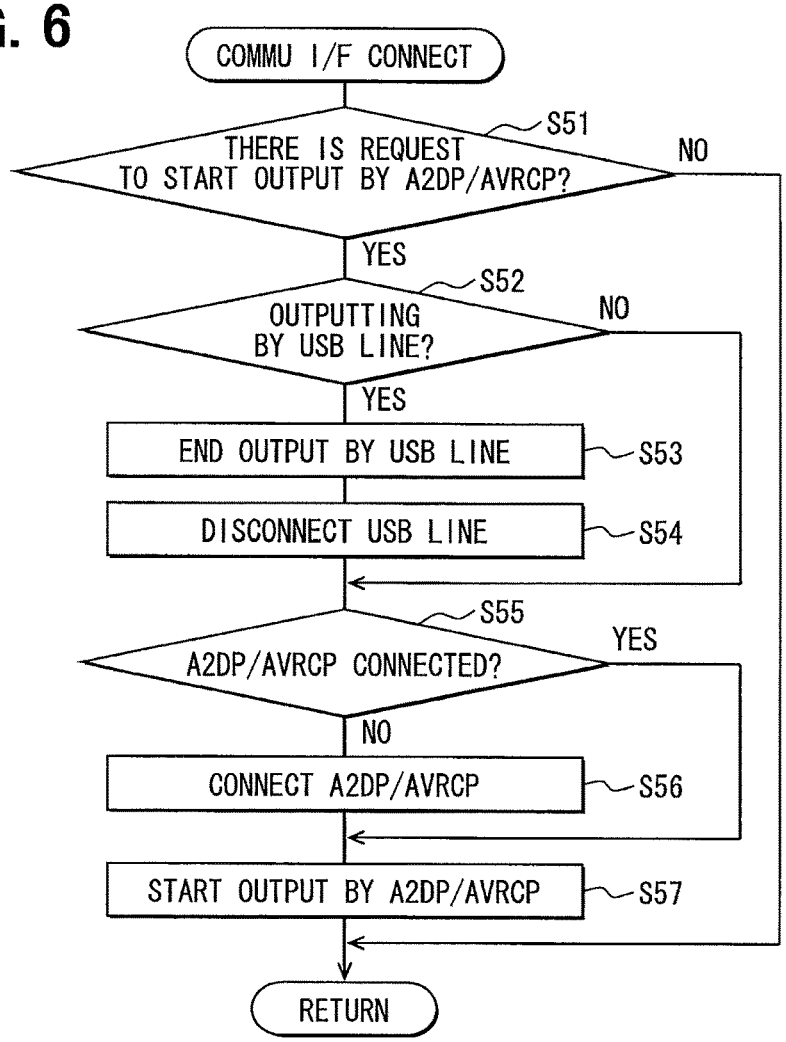
FIG. 6 is a flowchart illustrating an A2DP/AVRCP-based sound data output start request check processing.

(5) A2DP/AVRCP-Based Sound Data Output Start Request Check Processing (See FIG. 6)

After entering the A2DP/AVRCP-based sound data output start request check processing from the main processing, the control section 4 first determines whether or not there is a request to start outputting the sound data from the speaker 17a, 17b by the A2DP/AVRCP (step S51).

A condition for YES at step 51 is, for example, as follows. When the speaker 17a, 17b is outputting the sound data transmitted by the USB communication line, a user operates the operation apparatus 21 to instruct a change in communication interface from the USB communication line to the A2DP/AVRCP. Alternatively, when the speaker 17a, 17b is not outputting any sound data, the user operates the operation apparatus 21 to instruct the output of the sound data output by A2DP/AVRCP. When the control section 4 determines that there is a request to output the sound data from the speaker 17a, 17b by the A2DP/AVRCP (step S51=YES), the control section 4 determines whether or not the sound data is being outputted by the USB communication line (step S52).

When the control section 4 determines that no sound data is being outputted by the USB communication line (step S52=NO), the control section 4 determines whether or not the A2DP/AVRCP is connected between the BT module 5 and the BT module 24 (step S55). When the control section 4 determines that the A2DP/AVRCP is connected between the BT module 5 and the BT module 24 (step S55=YES), the control section 4 transmits a sound data output start request command from the BT module 5 to the BT module 24. Because of this, the sound data transmission from the BT module 24 to the BT module 5 by A2DP/AVRCP starts, and the control section 5 outputs the sound from the speaker 17a, 17b (step S57). Subsequently, the control section 4 ends the A2DP/AVRCP-based sound data output start request check processing and returns to the main processing.

When the control section 4 determines that the A2DP/AVRCP is not connected between the BT module 5 and the BT module 24 (step S55=NO), the control section 4 connects the A2DP/AVRCP between the BT module 5 and the BT module 24 (step S56) and transmits a sound data output start request command from the BT module 5 to the BT module 24. Because of this, the sound data transmission from the BT module 24 to the BT module 5 by A2DP/AVRCP starts, and the control section 5 outputs the sound from the speaker 17a, 17b (step S57). Subsequently, the control section 4 ends the A2DP/AVRCP-based sound data output start request check processing and returns to the main processing.

When the control section 4 determines that the sound data is being outputted by the USB communication line (step S52=YES), the control section 4 stops outputting the sound data by the USB communication line (step S53). Then, after disconnecting the USB communication line between the USB module 6 and the USB module 25 (step S54), the control section 4 executes the above-described steps S55 to S57. Thereafter, the control section 4 ends the A2DP/AVRCP-based sound data output start request check processing and returns to the main processing.

Figure 7:
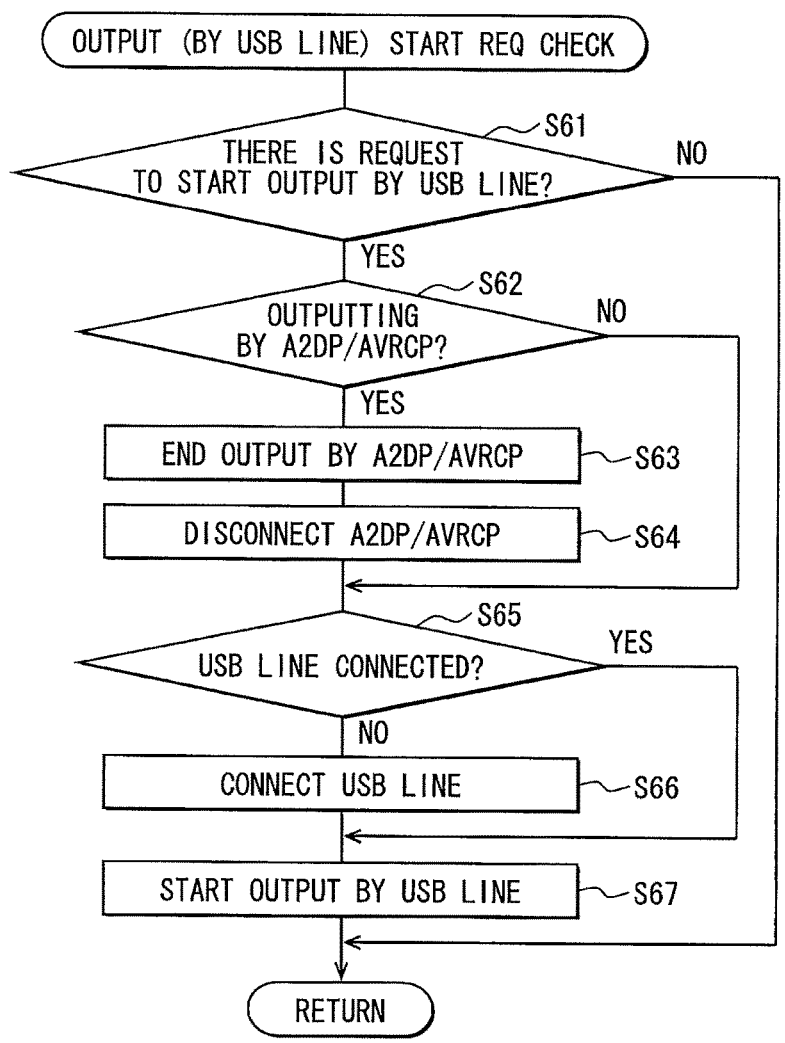
FIG. 7 is a flowchart illustrating a USB-communication-line-based sound data output start request check processing.

(6) USB-Communication-Line-Based Sound Data Output Start Request Check Processing (See FIG. 7)

After entering the USB-communication-line-based sound data output start request check processing from the main processing, the control section 4 first determines whether or not there is a request to start the sound data output by the USB communication line (step S61).

In step S61, the control section 4 determines that starting of sound data output from the speaker 17a, 17b by a USB communication line has been requested, for example, when it determines that, in a state where sound data transmitted from the mobile phone 3 by A2DP/AVRCP is being outputted from the speaker 17a, 17b, the communication interface was switched from A2DP/AVRCP to a USB communication line at the operation unit 21 or when it determines that, in a state with no sound data outputted from the speaker 17a, 17b, the operation unit 21 was operated to start sound data output by a USB communication line. When the control section 4 determines that starting of sound data output from the speaker 17a, 17b by a USB communication line has been requested (step S61=YES), the control section 4 determines whether or not sound data is being outputted by A2DP/AVRCP (step S62).

When the control section 4 determines that sound data is not being outputted by A2DP/AVRCP (step S62=NO), the control section 4 determines whether or not a USB communication line is connected between the USB module 6 and the USB module 25 (step S65). When the control section 4 determines that a USB communication line is connected between the USB module 6 and the USB module 25 (step S65=YES), the control section 4 has a sound data output start request command transmitted from the USB module 6 to the USB module 25. This causes sound data transmission from the USB module 25 to the USB module 6 by the USB communication line to be started and the sound to be outputted from the speaker 17a, 17b (step S67). Subsequently, the control section 4 ends the USB-communication-line-based sound data output start request check processing and returns to the main processing.

When the control section 4 determines that no USB communication line is connected between the USB module 6 and the USB module 25 (step S65=NO), the control section 4 connects a USB communication line between the USB module 6 and the USB module 25 (step S66) and has a sound data output start request command transmitted from the USB module 6 to the USB module 25. This causes sound data transmission from the USB module 25 to the USB module 6 by the USB communication line to be started and the sound to be outputted from the speaker 17a, 17b (step S67). Subsequently, the control section 4 ends the USB-communication-line-based sound data output start request check processing and returns to the main processing.

When the control section 4 determines that sound data is being outputted by A2DP/AVRCP (step S62=YES), the control section 4 terminates sound data output from the speaker 17a, 17b by A2DP/AVRCP (step S63) and, after disconnecting A2DP/AVRCP connected between the BT module 5 and the BT module 24 (step S64), executes steps S65 to S67 described above. Subsequently, the control section 4 ends the USB-communication-line-based sound data output start request check processing and returns to the main processing.

Figure 8:
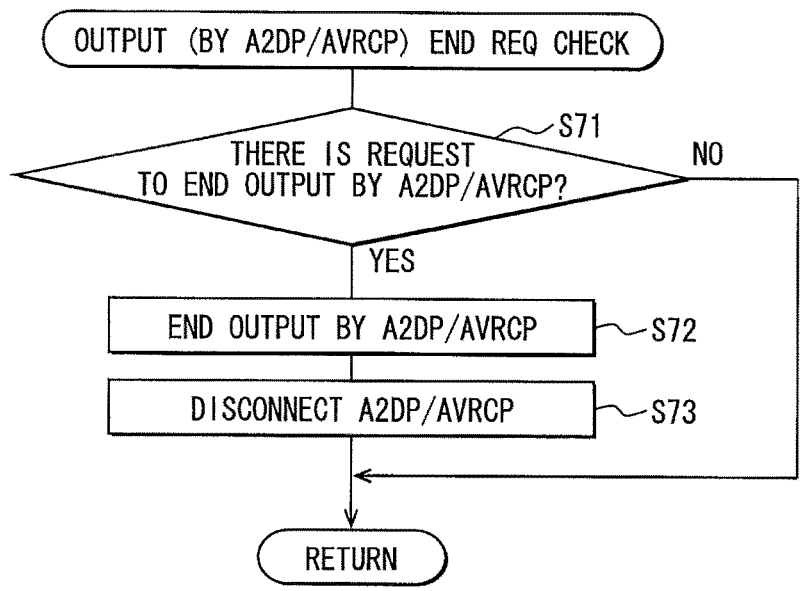
FIG. 8 is a flowchart illustrating an A2DP/AVRCP-based sound data output end request check processing.

(7) A2DP/AVRCP-Based Sound Data Output End Request Check Processing (See FIG. 8)

After entering the A2DP/AVRCP-based sound data output end request check processing from the main processing, the control section 4 first determines whether or not there is a request to terminate the sound data output from the speaker 17a, 17b by the A2DP/AVRCP (step S71). A condition for YES at step S71 is, for example, as follows. When the sound data transmitted from the BT module 24 to the BT module 5 by A2DP/AVRCP is being outputted from the speaker 17a, 17b, the user operates the operation unit 21 to input an output end instruction. When the control section 4 determines that there is the request to terminate the sound data output from the speaker 17a, 17b by the A2DP/AVRCP (step S71=YES), the control section 4 transmits a sound data output end request command from the BT module 5 to the BT module 24. This causes the sound data transmission from the BT module 24 to the BT module 5 by A2DP/AVRCP to be terminated and the sound output from the speaker 17a, 17b to be terminated (step S72).

Subsequently, the control section 4 disconnects the A2DP/AVRCP between the BT module 5 and the BT module 24 (step S73), ends the A2DP/AVRCP-based sound data output end request check processing, and returns to the main processing.

Figure 9:
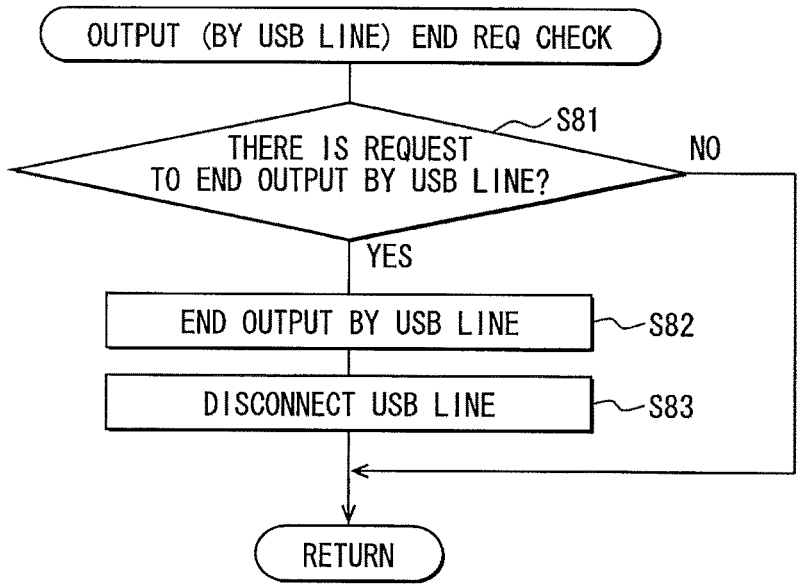
FIG. 9 is a flowchart illustrating a USB-communication-line-based sound data output end request check processing.

(8) USB-Communication-Line-Based Sound Data Output End Request Check Processing (See FIG. 9)

After entering the USB-communication-line-based sound data output end request check processing from the main processing, the control section 4 first determines whether or not there is a request to terminate the sound data output from the speaker 17a, 17b by the USB communication line (step S81). A condition for YES at step S81 is, for example, as follows. When the sound data transmitted from the USB module 25 to the USB module 6 by the USB communication line is being outputted from the speaker 17a, 17b, the user operates the operation unit 21 to input an output end instruction.

When the control section 5 determines that there is the request to terminate the sound data output from the speaker 17a, 17b by the USB communication line (step S81=YES), the control section 4 transmits a sound data output end request command from the USB module 6 to the USB module 25. This causes the sound data transmission from the USB module 25 to the USB module 6 by the USB communication line to be terminated and the sound output from the speaker 17a, 17b to be terminated (step S82).

Subsequently, the control section 4 disconnects the USB communication line connected between the USB module 6 and the USB module 25 (step S83), ends the USB-communication-line-based sound data output end request check processing, and returns to the main processing.

Figure 10:
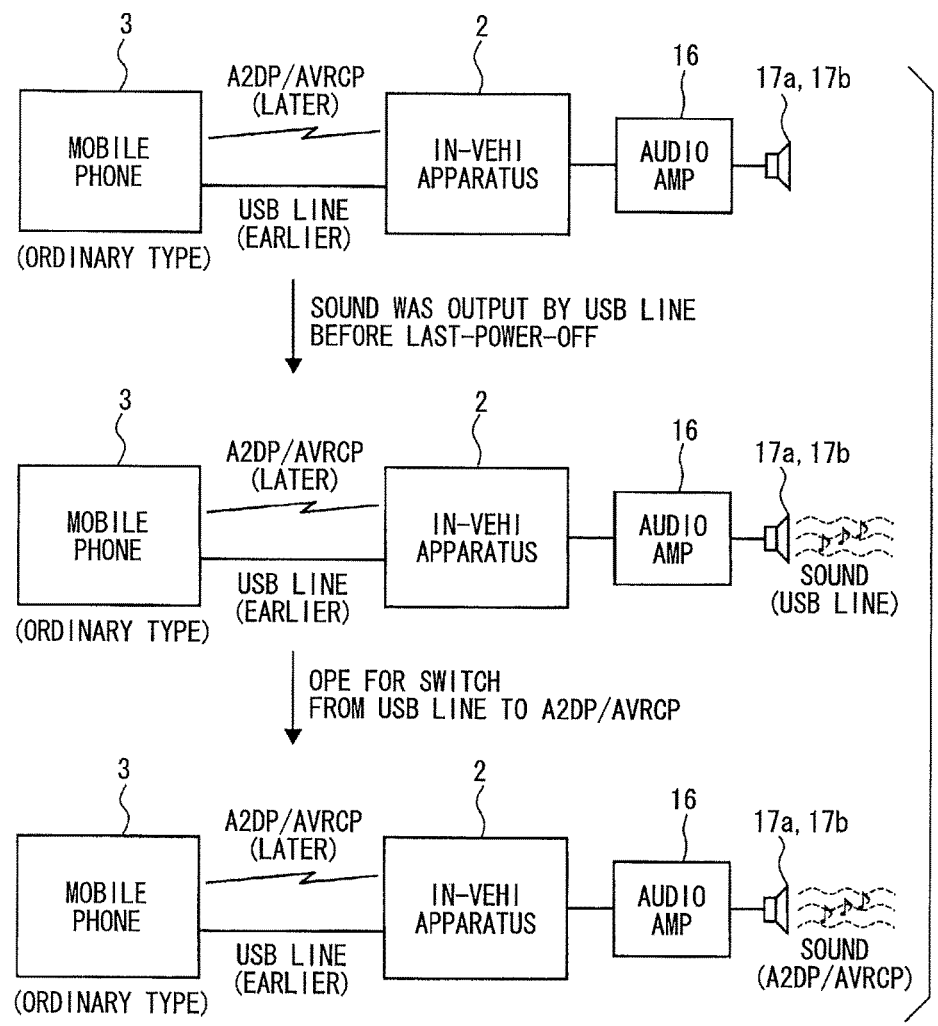
FIG. 10 is a diagram illustrating a change in communication interface connection in cases where a mobile phone is an ordinary type and a sound data transmitted by USB communication line had been outputted immediately before an in-vehicle apparatus was last powered off.
Figure 11:
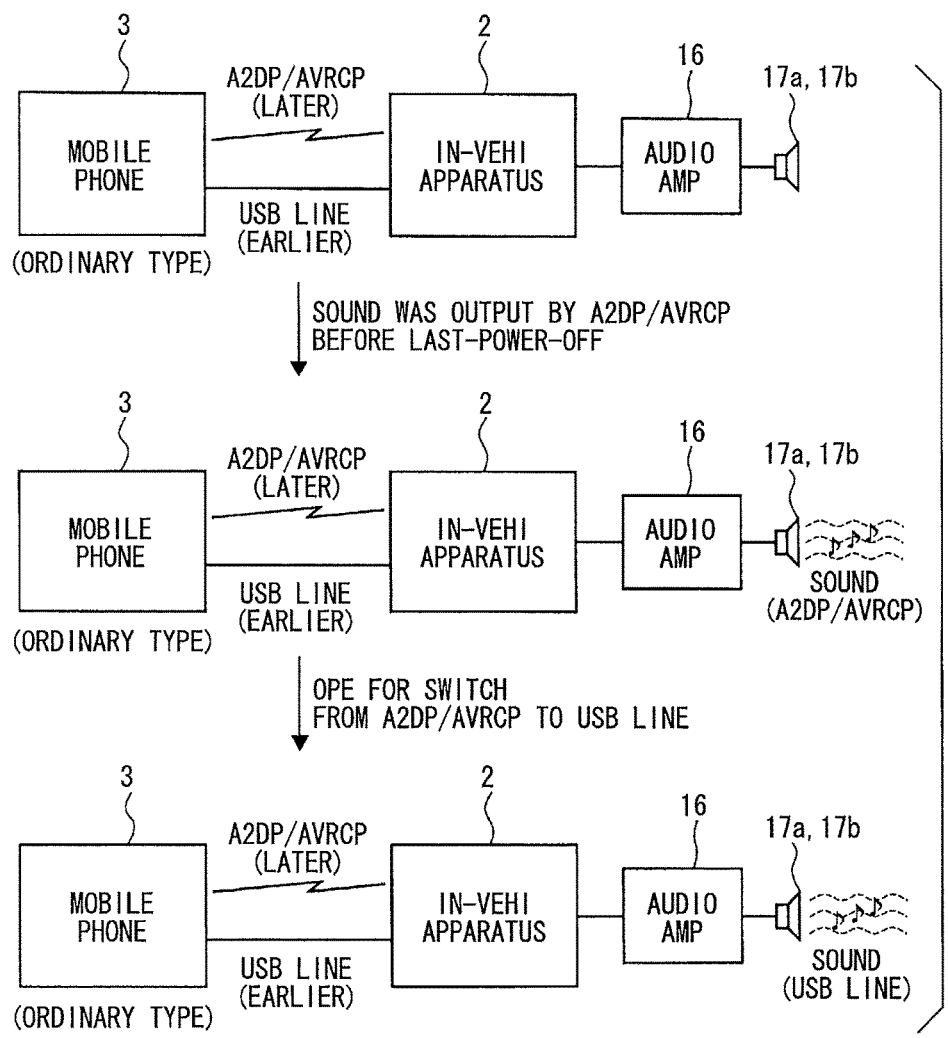
FIG. 11 is a diagram illustrating a change in communication interface connection in cases where a mobile phone is an ordinary type and a sound data transmitted by A2DP/AVRCP had been outputted immediately before an in-vehicle apparatus was last powered off.

The above processings will be described in more detail below by referring to exemplary situations where the USB communication line is an earlier-connected communication interface and the A2DP/AVRCP is a later-connected communication interface, as shown in FIGS. 10 and 11. One exemplary situation shown in FIG. 10 assumes that the sound data transmitted by the USB communication line had been outputted from the speaker 17a, 17b immediately before the in-vehicle apparatus 2 was last powered off. Another exemplary situation shown in FIG. 11 assumes that the sound data transmitted by the A2DP/AVRCP USB had been outputted from the speaker 17a, 17b immediately before the in-vehicle apparatus 2 was last powered off.

When the control section 4 determines that the mobile phone 3 acting as the communication counterparty of the in-vehicle apparatus 2 is the ordinary type apparatus, the communication interface usable to transmit the sound data does not depend on an order in which the communication interfaces are connected. In this case, the control section 4 may cause the operations illustrated in FIGS. 10 and 11 Specifically, as shown in FIGS. 10 and 11, after the in-vehicle apparatus 2 is powered on, the control section 4 causes, without disconnecting any connected-one of the USB communication line and the A2DP/AVRCP (while maintaining the connection), the start of the sound data transmission and the output of the sound from the speaker 17a, 17b by using the same communication interface that had been used for the sound data transmission immediately before the in-vehicle apparatus 2 was last powered off, regardless of which of the USB communication line and the A2DP/AVRCP had been used to transmit the sound data and output the sound from the speaker 17a, 17b immediately before the in-vehicle apparatus 2 was last powered off.

Subsequently, when the control section 4 determines that an output switching operation for switching to the USB communication line or A2DP/AVRCP has been performed, the control section 4 accordingly switches the communication interface for the sound data transmission without disconnecting the connected USB communication line and A2DP/AVRCP and starts transmitting the sound data by the communication interface switched to, causing the sound to be outputted from the speaker 17a, 17b.

Figure 12:
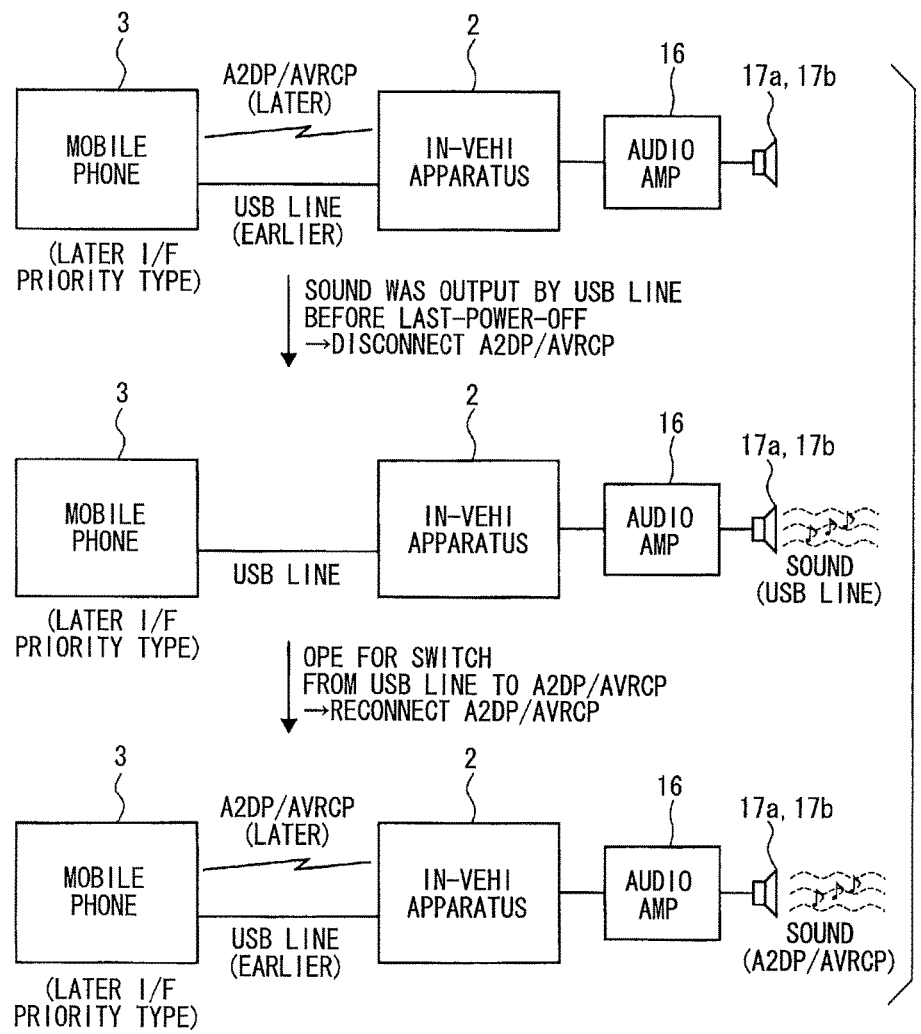
FIG. 12 is a diagram illustrating a change in communication interface connection in cases where a mobile phone is a later-connected interface priority type and a sound data transmitted by USB communication line had been outputted immediately before an in-vehicle apparatus was last powered off.

When the control section 4 determines that the mobile phone 3 acting as the communication counterparty of the in-vehicle apparatus 2 is the later-connected interface priority type apparatus, the communication interface usable to transmit the sound data is limited to a last-connected communication interface. In this case, as shown in FIG. 12, if the sound data transmitted by the USB communication line had been outputted immediately before the in-vehicle apparatus 2 was last powered off, in other words, if the sound data transmitted by an earlier-connected communication interface had been outputted immediately before the in-vehicle apparatus 2 was last powered off, the control section causes the following operation. The control section 4 disconnects the later-connected interface, which is the later-connected one of the USB communication line and the A2DP/AVRCP and which is the A2DP/AVRCP in this example. Additionally, the control section 4 starts the sound data transmission by the USB communication line that had been used to transmit the sound data immediately before the in-vehicle apparatus 2 was last powered off. Then, the control section 4 outputs the sound from the speaker 17a, 17b.

Subsequently, when the control section 4 determines that an output switching operation for switching from the USB communication line to the A2DP/AVRCP has been performed, the control section 4 reconnects the disconnected A2DP/AVRCP and switches the communication interface for sound data transmission from the USB communication line to the reconnected A2DP/AVRCP. The control unit 4 then starts sound data transmission by the reconnected A2DP/AVRCP, thereby starting sound output from the speaker 17a, 17b. Note that the control section 4 may reconnect the disconnected A2DP/AVRCP before an output switching operation for switching from the USB communication line to A2DP/AVRCP is performed. In such a case, even while sound data is being outputted by the USB communication line, it is possible to make the A2DP/AVRCP the later-connected communication interface. Also, if the A2DP/AVRCP is connected at a time when an output switching operation for switching from the USB communication line to A2DP/AVRCP is performed, the control section 4 may once disconnect and then reconnect the A2DP/AVRCP.

Figure 13:
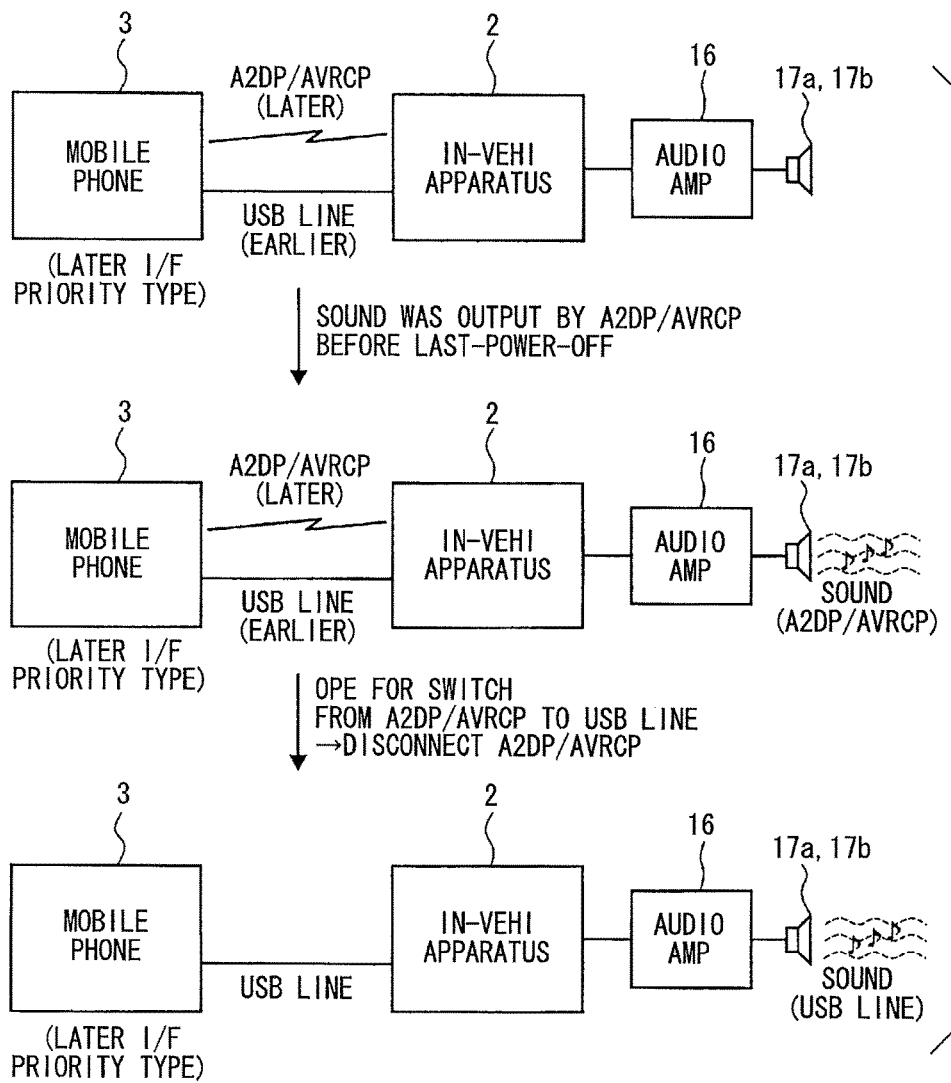
FIG. 13 is a diagram illustrating a change in communication interface connection in cases where a mobile phone is a later-connected interface priority type and a sound data transmitted by A2DP/AVRCP had been outputted immediately before an in-vehicle apparatus was last powered off.

When the sound data transmitted by a later-connected communication interface had been outputted immediately before the in-vehicle apparatus 2 was last powered off, in other words, when the sound data transmitted by the A2DP/AVRCP had been outputted immediately before the in-vehicle apparatus 2 was last powered off, the control section 4 starts, as shown in FIG. 13, without disconnecting any connected-one of the USB communication line and the A2DP/AVRCP, the sound data transmission by using the A2DP/AVRCP that had been used to transmit the sound data immediately before the in-vehicle apparatus 4 was last powered off. Accordingly, the control section 4 starts the sound output from the speaker 17a, 17b.

Subsequently, when the control section 4 determines that an output switching operation for switching from A2DP/AVRCP to the USB communication line is performed, the control section 4 disconnects the A2DP/AVRCP, which is the later-connected communication interface, and switches the communication interface for sound data transmission from the A2DP/AVRCP to the USB communication line. The control section 4 then starts the sound data transmission by the USB communication line switched to, thereby starting sound output from the speaker 17a, 17b.

Figure 14:
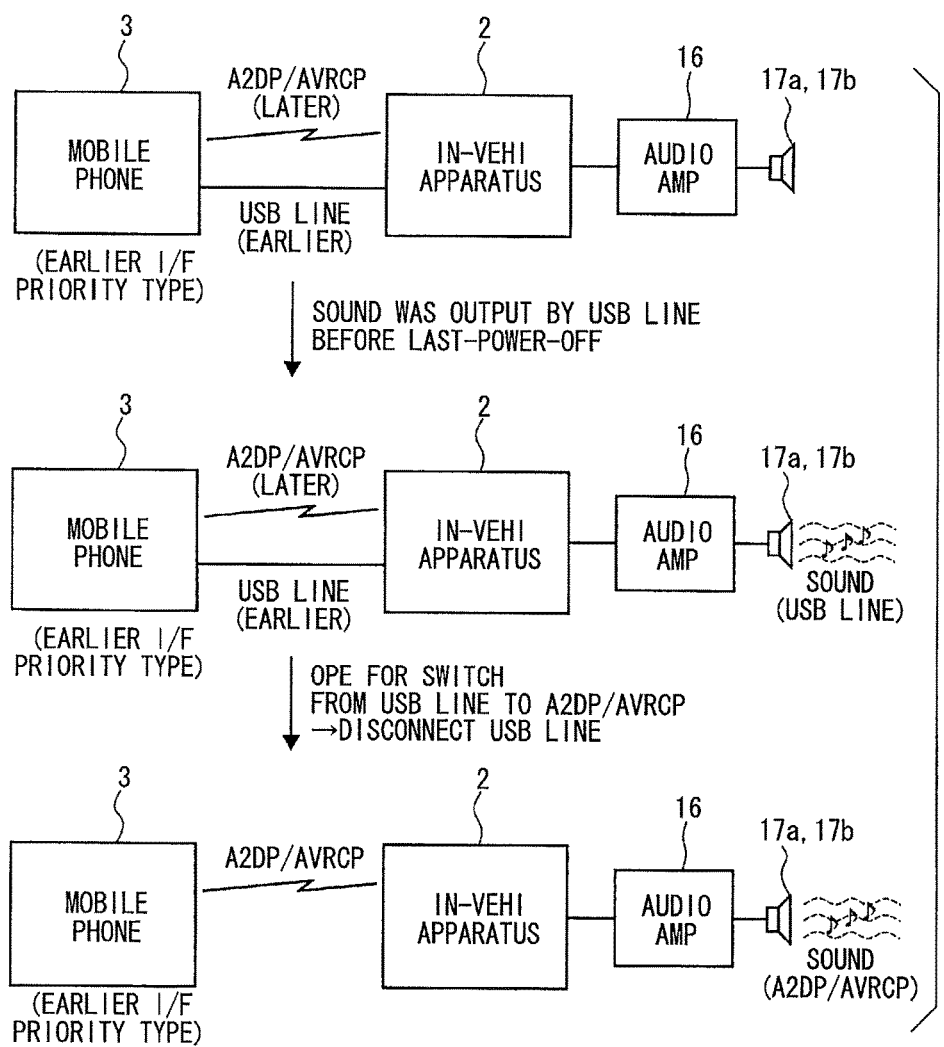
FIG. 14 is a diagram illustrating a change in communication interface connection in cases where a mobile phone is an earlier-connected interface priority type and a sound data transmitted by USB communication line had been outputted immediately before an in-vehicle apparatus was last powered off.

Another exemplary case will be described with reference to FIG. 14. In this case, the control section determines that the mobile phone 3 acting as the communication counterparty of the in-vehicle apparatus 2 is the earlier-connected interface priority type apparatus, and thus, the communication interface usable to transmit the sound data is limited to a first-connected communication interface. Therefore, if the sound data transmitted by a USB communication line had been outputted immediately before the in-vehicle apparatus 2 was last powered off, i.e., if the sound data transmitted by an earlier-connected communication interface has been outputted immediately before the in-vehicle apparatus 2 was last powered off, the control section 4 starts, without disconnecting any one of the connected USB communication line and A2DP/AVRCP, the sound data transmission and the sound output from the speaker 17a, 17b by using the USB communication line that had been used to transmit the sound data immediately before the in-vehicle apparatus 2 was last powered off.

Subsequently, when the control section 4 determines that an output switching operation for switching from the USB communication to the A2DP/AVRCP is performed, the control section 4 disconnects the USB communication line, i.e. the earlier-connected communication interface, and switches the communication interface for sound data transmission from the USB communication line to the A2DP/AVRCP. The control section 4 then starts sound data transmission using the A2DP/AVRCP switched to, thereby causing sound output from the speaker 17a, 17b to be started.

Figure 15:
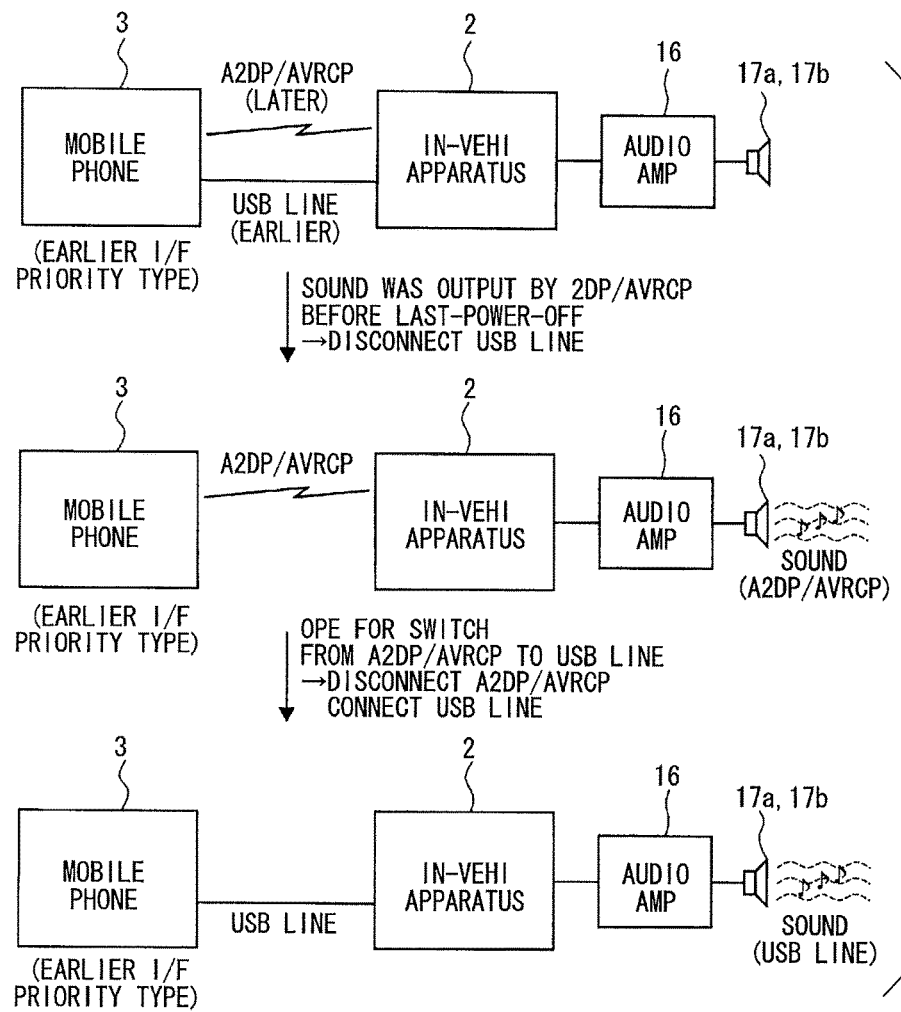
FIG. 15 is a diagram illustrating a change in communication interface connection in cases where a mobile phone is an earlier-connected interface priority type and a sound data transmitted by A2DP/AVRCP had been outputted immediately before an in-vehicle apparatus was last powered off.

When the sound data transmitted by the A2DP/AVRCP had been outputted immediately before the in-vehicle apparatus 2 was last powered off as shown in FIG. 15., in other words, when the sound data transmitted by the later-connected communication interface had been outputted immediately before the in-vehicle apparatus 2 was last powered off, the control section 4 disconnects the USB communication line, which is the earlier-connected communication interface out of the USB communication line and the A2DP/AVRCP, and additionally, the control section 4 starts the sound data transmission by using the A2DP/AVRCP that had been used to transmit the sound data immediately before the in-vehicle apparatus 2 was last powered off, thereby starting sound output from the speaker 17a, 17b.

Subsequently, when the control section 4 determines that an output switching operation for switching from the A2DP/AVRCP to the USB communication line is performed, the control section 4 disconnects the A2DP/AVRCP, reconnects the USB communication line, and switches the communication interface for sound data reception from the A2DP/AVRCP to the USB communication line. The control section 4 then starts sound data transmission by the USB communication line switched to, thereby starting sound output from the speaker 17a, 17b.

Assuming two situations, FIG. 16 summarizes the processings described above with reference to FIGS. 10 to 1. One assumed situation is that where the USB communication line was made connected earlier than the A2DP/AVRCP, the sound data transmitted by the USB communication line had been outputted from the speaker 17a, 17b immediately before the in-vehicle apparatus 2 was last powered off. The other assumed situation is that where the USB communication line was made connected earlier than the A2DP/AVRCP, the sound data transmitted by the A2DP/AVRCP had been outputted from the speaker 17a, 17b immediately before the in-vehicle apparatus 2 was last powered off. Substantially the same as in FIG. 16 is applicable when the order of connecting the USB communication line and the A2DP/AVRCP is reversed. Assuming two situations, FIG. 17 summarizes the processings described above with reference to FIGS. 10 to 15. One assumed situation is that where the A2DP/AVRCP was made connected earlier than the USB communication line, the sound data transmitted by the USB communication line has been outputted from the speaker 17a, 17b immediately before the in-vehicle apparatus 2 was last powered off. The other assumed situation is that where the A2DP/AVRCP was made connected earlier than the USB communication line, the sound data transmitted by the A2DP/AVRCP had been outputted from the speaker 17a, 17b immediately before the in-vehicle apparatus 2 was last powered off.

In the above described configuration, since the communication interfaces capable of sound data transmission, which are the, USB communication line and the A2DP/AVRCP, are automatically connected immediately after the in-vehicle apparatus 2 is powered on, the last-used communication interface check processing is performed to enable control of the connection/disconnection of the USB communication line and the A2DP/AVRCP based on the communication interface that has been used to transmit the sound data immediately before the in-vehicle apparatus 2 was last powered off. However, if the communication interfaces capable of sound data transmission are not automatically connected immediately after the in-vehicle apparatus 2 is powered on, the last-used communication interface check processing may be performed in the following way (see FIG. 18).

Figure 18:
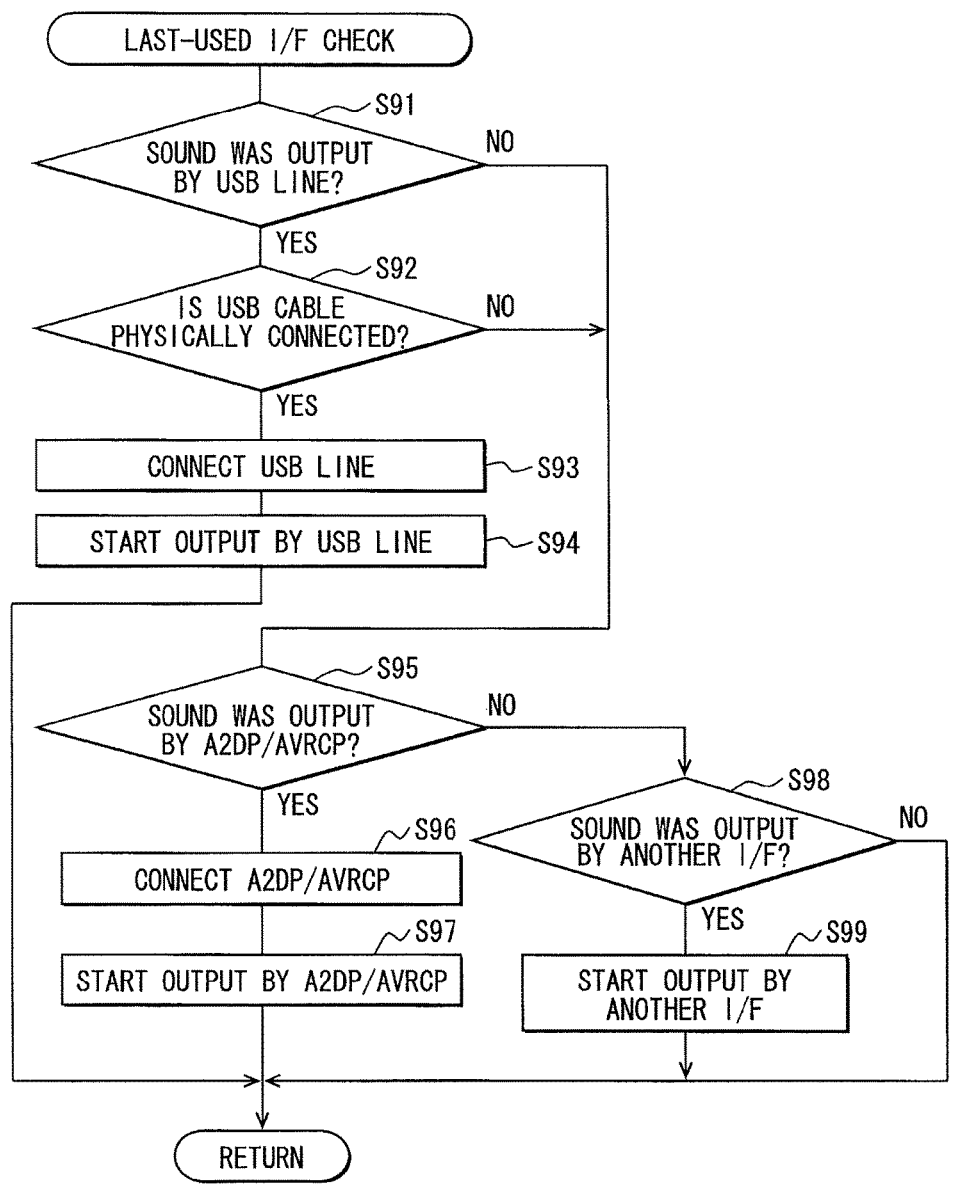
FIG. 18 is a flowchart illustrating a last-used communication interface check processing of one modification example.

As shown in FIG. 18, after entering the last-used communication interface check processing from the main processing, the control section 4 first determines whether or not the sound data transmitted from the USB module 25 to the USB module 6 by the USB communication line has been outputted immediately before the in-vehicle apparatus was last powered off (the ACC switch off) (step S91).

When the control section 4 determines that the sound data transmitted by the USB communication line had been outputted immediately before the in-vehicle apparatus 2 was last powered off (step S91=YES), the control section 4 determines whether or not the USB connection cable 14 is physically connected between the in-vehicle apparatus 2 and the mobile phone 3 (step S92). When the control section 4 determines that the USB connection cable 14 is physically connected between the in-vehicle apparatus 2 and the mobile phone 3 (step S92=YES), the control section 4 connects the USB communication line between the USB module 6 and the USB module 25 (enabling USB communication) (step S93) and transmits a sound data output start request command from the USB module 6 to the USB module 25. Because of this, the control section 4 causes the start of the sound data transmission from the USB module 25 to the USB module 6 by the USB communication line and causes the start of the sound output from the speaker 17a, 17b (step S94). Subsequently, the control section 4 ends the last-used communication interface check processing and returns to the main processing.

When the control section 4 determines that the sound data transmitted by the USB communication line had not been outputted immediately before the in-vehicle apparatus 2 was last powered off (step S91=NO), the control section 4 determines whether or not the sound data transmitted from the BT module 24 to the BT module 5 by the A2DP/AVRCP had been outputted immediately before the in-vehicle apparatus 2 was last powered off (step S95).

When the control section 4 determines that sound data transmitted by the A2DP/AVRCP had been outputted immediately before the in-vehicle apparatus 2 was last powered off (step S95=YES), the control section 4 connects the A2DP/AVRCP between the BT module 5 and the BT module 24 (step S96) and transmits a sound data output start request command from the BT module 5 to the BT module 24. Because of this, the controls section 4 causes the start of the sound data transmission from the BT module 24 to the BT module 5 by the A2DP/AVRCP and causes the start of the sound output from the speaker 17a, 17b (step S97). Subsequently, the control section 4 ends the last-used communication interface check processing and returns to the main processing.

When the control section 4 determines that the sound data transmitted by the A2DP/AVRCP had not been outputted immediately before the in-vehicle apparatus 2 was last powered off (step S95=NO), the control section 4 determines whether or not the sound data has been outputted using another communication interface (step S98). When the control section 4 determines that the sound data had been outputted using another communication interface (step S98=YES), the control section 4 starts the sound data output from the speaker 17a, 17b using the another communication interface (step S99). Subsequently, the control section 4 ends the last-used communication interface check processing and returns to the main processing.

In the above series of processings, it is determined which communication interface had been used to transmit the sound data immediately before the in-vehicle apparatus 2 was last powered off, and thereafter, the same communication interface as the one that had been used to transmit the sound data transmission immediately before the in-vehicle apparatus 2 was last powered off is connected again. Therefore, in order to appropriately transmit the sound data from the mobile phone 3, it is unnecessary to determine the type of the mobile phone 3 (the type of the communication counterpart of the in-vehicle apparatus 2). Additionally, it is possible to appropriately transmit the sound data from the mobile phone 3 regardless of the type of the mobile phone 3 (the type of the communication counterpart of the in-vehicle apparatus 2)

In the present embodiment, in order to transmit the sound data from the mobile phone 3 to the in-vehicle apparatus 2 by the USB communication line, the in-vehicle apparatus 2 controls connection/disconnection of the USB communication line and the A2DP/AVRCP so as to enable the mobile phone 3 to transmit he sound data by the USB communication line. Similarly, in order to transmit the sound data from the mobile phone 3 the in-vehicle apparatus 2 by the A2DP/AVRCP, the in-vehicle apparatus 2 controls connection/disconnection of the USB communication line and A2DP/AVRCP so as to enable the mobile phone 3 to transmit the sound data using the A2DP/AVRCP. This enables the mobile phone 3 to appropriately transmit the sound data even when the mobile phone 3 is designed to not appropriately transmit the sound data in the case of the concurrently (simultaneously) connection of the USB communication line and the A2DP/AVRCP.

Specifically, where (i) the USB communication line was made connected earlier than the A2DP/AVRCP, (ii) the mobile phone 3 acting as the communication counterpart of the in-vehicle apparatus 2 is the later-connected interface priority type apparatus, and (iii) the sound data transmitted by the USB communication line had been outputted immediately before the in-vehicle apparatus 2 was last powered off, the earlier-connected communication interface, i.e. the USB communication line is kept connected and the later-connected communication interface, i.e. A2DP/AVRCP, is disconnected. In this way, the sound data transmission can be started and the sound output from the speaker 17a, 17b can be started using the USB communication line, in other words, the same communication interface as the one that had been used for sound data transmission immediately before the in-vehicle apparatus 2 was last powered off.

Furthermore, where (i) the USB communication line was made connected earlier than the A2DP/AVRCP, (ii) the mobile phone 3 acting as the communication counterpart of the in-vehicle apparatus 2 is the earlier-connected interface priority type apparatus, and (iii) the sound data transmitted by the A2DP/AVRCP had been outputted immediately before the in-vehicle apparatus 2 was last powered off, the later-connected communication interface, i.e. A2DP/AVRCP is kept connected and the earlier-connected communication interface, i.e. the USB communication line, is disconnected. In this way, the sound data transmission and the sound output from the speaker 17a, 17b can be started using the A2DP/AVRCP, i.e. the same communication interface as the one that had been used for sound data transmission immediately before the in-vehicle apparatus 2 was last powered off.

Embodiments are not limited to the above embodiments and can be modified or expanded in various ways, example of which will be described.

For example, the short-range wireless communication apparatus may be other than the in-vehicle apparatus 2. As long as the short-range wireless communication apparatus includes a BT module having a function comparable to that of the BT module 5, the short-range wireless communication apparatus may be, for example, a navigation apparatus having a navigation function. Additionally, the short-range wireless communication apparatus may not be required to be an in-vehicle apparatus. The communication counterparty apparatus, which is the communication counterparty of the short-range wireless communication apparatus, is not limited to the mobile phone 3. As long as the communication counterparty apparatus includes a BT module having a function comparable to that of the BT module 24, the communication counterparty apparatus may be a portable information terminal or the like, or alternatively, the communication counterparty apparatus may be a fixed terminal, which is not portable.

The above embodiments are applicable not only to cases where two communication interfaces are simultaneously connected but also to cases where three or more communication interfaces are simultaneously connected. In cases where three or more communication interfaces are simultaneously connected also, the connection/disconnection of the communication interfaces can be controlled based on the type of the mobile phone 3 (the type of the communication counterpart of the in-vehicle apparatus 2). Specifically, in cases where three communication interfaces such as a USB communication line, A2DP/AVRCP and WiFi are connected, the control may be performed in the following way. For example, where (i) the USB communication line was connected first, (ii) the A2DP/AVRCP was connected second, (iii) the WiFi was connected third, (iv) the mobile phone 3 acting as the communication counterpart of the in-vehicle apparatus 2 is the later-connected interface priority type apparatus, the A2DP/AVRCP and WiFi may be disconnected in response to a request to start output of the sound data by the USB communication line. In response to a request to start output of the sound data by the WiFi, the WiFi may be kept connected.

The in-vehicle apparatus 2 may be configured to be capable of storing the type of each communication counterparty apparatus. When a BT communication line or a USB communication line is connected between the in-vehicle apparatus 2 and the communication counterparty apparatus, the in-vehicle apparatus 2 stores identification information received from the communication counterparty apparatus, so that the in-vehicle apparatus 2 can identify the type of the communication counterparty apparatus next time the BT communication line or USB communication line is connected between the in-vehicle apparatus 2 and the communication counterparty apparatus.

The present disclosure has various aspects. For example, according to a first aspect, a short-range wireless communication apparatus can be configured as follows. The short-range wireless communication apparatus comprises a plurality of connection devices and a control device. The plurality of connection devices is capable of simultaneously connecting a plurality of communication interfaces to a communication counterparty apparatus, respectively, and capable of causing transfer of sound data from the communication counterparty apparatus by the plurality of communication interfaces, respectively. The control device is configured to cause a sound data output device to selectively output the sound data transferred from the communication counterparty apparatus to any of the connection devices by any of the communication interfaces. When the control device determines that, in cases where the communication interfaces are communicably connected, there arises a request to start outputting the sound data transferred by one of the communication interfaces, the control device disconnects another one of the communication interfaces while keeping the one of the communication interfaces connected and causes the sound data output device to output the sound data that is transferred from the communication counterparty apparatus by the one of the communication interfaces.

According to the above configuration, even if the communication counterparty apparatus is designed to be incapable of appropriately transfer the sound data due to the simultaneously-connected multiple communication interfaces between the short-range wireless communication apparatus and the communication counterparty apparatus, the short-range wireless communication apparatus can cause the communication counterparty apparatus to appropriately transfer the sound data by disconnecting the another one of the communication interfaces while maintaining the connection of the one of the communication interfaces associated with the sound data output start request.

The above short-range wireless communication apparatus may be configured as follows. When the control device determines that, in cases where the communication interfaces are communicably connected, there arises the request to start outputting the sound data transferred by one of the communication interfaces, the control device disconnects all the others of the communication interfaces while keeping the one of the communication interfaces connected and causes the sound data output device to output the sound data that is transferred from the communication counterparty apparatus by the one of the communication interfaces. In the above, the all the others of the communication interfaces is all of the multiple communication interfaces except the one of the communication interfaces.

According to the above configuration, even if the communication counterparty apparatus is designed to be incapable of appropriately transferring the sound data due to the simultaneously-connected multiple communication interfaces between the short-range wireless communication apparatus and the communication counterparty apparatus, the short-range wireless communication apparatus can cause the communication counterparty apparatus to appropriately transfer the sound data by disconnects all the others of the communication interfaces (which may be multiple interfaces) while maintaining the connection of the one of the communication interfaces associated with the request to start outputting the sound data.

The above short-range wireless communication apparatus may be configured as follows. When the control device determines that, in cases where the communication interfaces are communicably connected, there arises the request to start outputting the sound data transferred by a last-connected communication interface which is one of the communication interfaces that was connected last among the communication interfaces, the control device disconnects another one of the communication interfaces while keeping the one of the communication interfaces connected and causes the sound data output device to output the sound data that is transferred from the communication counterparty apparatus by the one of the communication interfaces.

According to the above configuration, even if the communication counterparty apparatus is designed to be capable of transferring the sound data only by the last-connected communication interface (in other words, even if the communication counterparty apparatus is the later-connected interface priority type apparatus), the short-range wireless communication apparatus can causes the last-connected communication interface to be only an available communication interface for the communication counterparty apparatus to transfer the sound data. This can be done by disconnecting the other of the communication interfaces while keeping the last-connected communication interface connected.

The above short-range wireless communication apparatus may be configured as follows. After disconnecting the another one of the communication interfaces, the control device reconnects the disconnected another one of the communication interfaces.

According to the above configuration, since the short-range wireless communication apparatus can disconnect the another one of the communication interfaces (which is other than the one of the communication interfaces) and thereafter reconnect the disconnected another one of the communication interfaces, the reconnected another one of the communication interfaces can be made the last-connected communication interface. Therefore, at a time when the communication interface associated with the request to start outputting the sound data is changed from the one of the communication interfaces to the another one of the communication interfaces, the another one of the communication interfaces has been already connected. Therefore, it becomes possible to continuously transfer the sound data by the another one of the communication interfaces.

The above short-range wireless communication apparatus may be configured as follows. When the control device determines, after disconnecting the another one of the communication interfaces, that there arises a request to start outputting the sound data by the another one of the communication interfaces, the control device performs control such that if the another one of the communication interfaces is currently connected, the control device disconnects and then reconnects the another one of the communication interfaces.

According to the above configuration, if the another one of the communication interfaces is currently connected at a time when the request is changed from the request to start outputting by the one of the communication interfaces to the request to start outputting by the another one of the communication interfaces, the short-range wireless communication apparatus can make the another communication interface the last-connected communication interface by disconnecting and then reconnecting the another one of the communication interfaces, thereby enabling the transfer of the sound data by the another one of the communication interfaces.

The above short-range wireless communication apparatus may be configured as follows. When the control device determines, after disconnecting the another one of the communication interfaces, that there arises a request to start outputting the sound data by the another one of the communication interfaces, the control device performs control such that if the another one of the communication interfaces is currently unconnected, the control device reconnects the another one of the communication interfaces.

According to the above configuration, if the another one of the communication interfaces is currently unconnected at a time when the request is changed from the request to start outputting by the one of the communication interfaces to the request to start outputting by the another one of the communication interfaces, the short-range wireless communication apparatus can make the another communication interface the last-connected communication interface by reconnecting the another one of the communication interfaces, thereby enabling the transfer of the sound data by the another one of the communication interfaces The above short-range wireless communication apparatus may be configured as follows. When the control device determines that, in cases where the communication interfaces are communicably connected, there arises the request to start outputting the sound data transferred by a first-connected communication interface which is one of the communication interfaces that was made connected first among the communication interfaces, the control device disconnects another one of the communication interfaces while keeping the one of the communication interfaces connected and causes the sound data output device to output the sound data that is transferred from the communication counterparty apparatus by the one of the communication interfaces.

According to the above configuration, even if the communication counterparty apparatus is designed to be capable of transferring the sound data only by the first-connected communication interface (in other words, even if the communication counterparty apparatus is the earlier-connected interface priority type apparatus), the short-range wireless communication apparatus can causes the first-connected communication interface to be only an available communication interface for the communication counterparty apparatus to transfer the sound data. This can be done by, while keeping the last-connected communication interface connected, disconnecting the other of the communication interfaces. Namely, even when the communication counterparty apparatus is the earlier-connected interface priority type apparatus, the short-range wireless communication apparatus can cause the communication counterparty apparatus, which is the earlier-connected interface priority type apparatus, to transfer the sound data by the first-connected communication interface.

The above short-range wireless communication apparatus may be configured as follows. When the control device determines, after disconnecting the another one of the communication interfaces, that there arises a request to start outputting the sound data by the another one of the communication interfaces, the control device disconnects all of the communication interfaces including the one of the communication interfaces and thereafter reconnects the another one of the communication interfaces.

According to the above configuration, when the request is changed from the request to start outputting the sound data by the one of the communication interfaces to the request to start outputting the sound data by the another one of the communication interfaces, the short-range wireless communication apparatus can disconnect all of the communication interfaces including the one of the communication interfaces and thereafter reconnect the another one of the communication interfaces, thereby enabling the transfer of the sound data by the another one of the communication interfaces.

According to a second aspect of the present disclosure, a short-range wireless communication apparatus can be configured as follows. The short-range wireless communication apparatus comprises: a plurality of connection devices capable of simultaneously connecting a plurality of communication interfaces to a communication counterparty apparatus, and causing transfer of sound data from the communication counterparty apparatus by the plurality of communication interfaces respectively; and a control device for causing a sound data output device to selectively output the sound data transferred from the communication counterparty apparatus to any of the connection devices by any of the communication interfaces. When the control device determines that, in cases where one of the communication interfaces is not communicably connected and another one of the communication interfaces is communicably connected, there arises a request to start outputting the sound data transferred by the one of the communication interfaces, the control device disconnects the another one of the communication interfaces and thereafter connects the one of the communication interfaces and causes the sound data output device to output the sound data that is transferred from the communication counterparty apparatus by the one of the communication interfaces. Alternatively, when the control device determines that, in cases where one of the communication interfaces is not communicably connected and all the others of the communication interfaces is communicably connected, there arises a request to start outputting the sound data transferred by the one of the communication interfaces, the control device disconnects the another one of the communication interfaces and thereafter connects the one of the communication interfaces and causes the sound data output device to output the sound data that is transferred from the communication counterparty apparatus by the one of the communication interfaces.

According to the above configuration, even if the communication counterparty apparatus is designed to be incapable of appropriately transfer the sound data due to the simultaneously-connected multiple communication interfaces between the short-range wireless communication apparatus and the communication counterparty apparatus, the short-range wireless communication apparatus can cause the communication counterparty apparatus to appropriately transfer the sound data by disconnecting the another one of the communication interfaces and thereafter connecting the one of the communication interfaces.

It should be noted that the present disclosure is intended to cover various modification and equivalent arrangements. In addition, while the various combinations and configurations, other combinations and configurations, including more, less or only a single element, are also within the spirit and scope of the present disclosure.

What is claimed is:

1. An in-vehicle apparatus comprising:
a first communication interface is connectable to a communication counterparty apparatus by wireless connections and a second communication interface is connectable to a communication counterparty apparatus by wired connections for transferring sound data from the communication counterparty apparatus; and
a control device configured to cause a sound data output device to output the sound data selectively transferred by the first communication interface or the second communication interface from the communication counterparty apparatus, wherein:
when transfer of the sound data by the first communication interface is requested by a user while (i) the first communication interface and the second communication interface are connected to the communication counterparty apparatus and (ii) the sound data is not being transferred by the first communication interface nor the second communication interface, the control device causes the first communication interface to transfer the sound data and keeps the second communication interface connected to the communication counterparty apparatus;
when transfer of the sound data by the second communication interface is requested by the user while the sound data is being transferred by the first communication interface, the control device disconnects the first communication interface connected to the communication counterparty apparatus and causes the second communication interface to transfer the sound data;
wherein:
the first communication interface is a Bluetooth interface capable of multi-connection of HFP (Hands Free Profile) and A2DP (Advanced Audio Distribution Profile); and
when the transfer of the sound data by the second communication interface is requested by the user while (i) the HFP and the A2DP of the first communication interface are connected to the communication counterparty apparatus and (ii) the sound data is being transferred by the A2DP of the first communication interface, the control device disconnects the A2DP of the first communication interface connected to the communication counterparty apparatus and keeps the HFP of the first communication interface connected to the communication counterparty apparatus and causes the second communication interface to transfer the sound data.

2. The in-vehicle apparatus according to claim 1, wherein:
when the control device connects the first and second communication interfaces to the communication counterparty apparatus upon power on of the in-vehicle apparatus, the control device determines a last-used communication interface to cause the last-used communication interface to transfer the sound data; and
the last-used communication interface is one of the first and second communication interfaces that had transferred the sound data immediately before last power off of the in-vehicle apparatus.

3. An in-vehicle apparatus comprising:
a first communication interface is connectable to a communication counterparty apparatus by wireless connections and a second communication interface is connectable to a communication counterparty apparatus by wired connections for transferring sound data from the communication counterparty apparatus; and a control device configured to cause a sound data output device to output the sound data selectively transferred by the first communication interface or the second communication interface from the communication counterparty apparatus, wherein:
when transfer of the sound data by the first communication interface is requested by a user while (i) the first communication interface and the second communication interface are connected to the communication counterparty apparatus and (ii) the sound data is not being transferred by the first communication interface nor the second communication interface, the control device causes the first communication interface to transfer the sound data and keeps the second communication interface connected to the communication counterparty apparatus;
when transfer of the sound data by the second communication interface is requested by the user while the sound data is being transferred by the first communication interface, the control device disconnects the first communication interface connected to the communication counterparty apparatus and causes the second communication interface to transfer the sound data;
wherein:
the first communication interface is a Bluetooth interface capable of multi-connection of HFP (Hands Free Profile) and A2DP (Advanced Audio Distribution Profile) and AVRCP (Audio/Video Remote Control Profile); and
when the transfer of the sound data by the second communication interface is requested by the user while (i) the HFP, the A2DP and the AVRCP of the first communication interface are connected to the communication counterparty apparatus and (ii) the sound data is being transferred by the A2DP of the first communication interface, the control device disconnects the A2DP and the AVRCP of the first communication interface connected to the communication counterparty apparatus and keeps the HFP of the first communication interface connected to the communication counterparty apparatus and causes the second communication interface to transfer the sound data.

4. A method comprising:
causing a sound data output device to output sound data that is transferred from a communication counterparty apparatus to an in-vehicle apparatus selectively by a first communication interface or a second communication interface,
wherein:
causing the sound data output device to output the sound data includes:
causing the first communication interface to transfer the sound data and keeping the second communication interface connected between the in-vehicle apparatus and the communication counterparty apparatus, when transfer of the sound data by the first communication interface is requested by a user while (i) the first communication interface and the second communication interface are connected between the in-vehicle apparatus and the communication counterparty apparatus and (ii) the sound data is not being transferred by the first communication interface nor the second communication interface;
disconnecting the first communication interface connected between the in-vehicle apparatus and the communication counterparty apparatus and causing the second communication interface to transfer the sound data, when transfer of the sound data by the second communication interface is requested by the user while the sound data is being transferred by the first communication interface;
wherein:
the first communication interface is a Bluetooth interface capable of multi-connection of HFP (Hands Free Profile) and A2DP (Advanced Audio Distribution Profile); and
disconnecting the first communication interface and causing the second communication interface to transfer the sound data include
disconnecting the A2DP of the first communication interface connected between the in-vehicle apparatus and the communication counterparty apparatus while keeping the HFP of the first communication interface connected between the in-vehicle apparatus and the communication counterparty apparatus and causing the second communication interface to transfer the sound data, when the transfer of the sound data by the second communication interface is requested by the user while (i) the HFP and the A2DP of the first communication interface are connected between the in-vehicle apparatus and the communication counterparty apparatus and (ii) the sound data is being transferred by the A2DP of the first communication interface.

5. The method according to claim 4, wherein:
causing the sound data output device to output the sound data further includes:
determining a last-used communication interface to cause the last-used communication interface to transfer the sound data, when the first and second communication interfaces are connected between the in-vehicle apparatus and the communication counterparty apparatus after power on of the in-vehicle apparatus,
wherein the last-used communication interface is one of the first and second communication interfaces that had transferred the sound data immediately before last power off of the in-vehicle apparatus.

6. A method comprising:
causing a sound data output device to output sound data that is transferred from a communication counterparty apparatus to an in-vehicle apparatus selectively by a first communication interface or a second communication interface,
wherein:
causing the sound data output device to output the sound data includes:
causing the first communication interface to transfer the sound data and keeping the second communication interface connected between the in-vehicle apparatus and the communication counterparty apparatus, when transfer of the sound data by the first communication interface is requested by a user while (i) the first communication interface and the second communication interface are connected between the in-vehicle apparatus and the communication counterparty apparatus and (ii) the sound data is not being transferred by the first communication interface nor the second communication interface; and
disconnecting the first communication interface connected between the in-vehicle apparatus and the communication counterparty apparatus and causing the second communication interface to transfer the sound data, when transfer of the sound data by the second communication interface is requested by the user while the sound data is being transferred by the first communication interface;

wherein:

the first communication interface is a Bluetooth interface capable of multi-connection of HFP (Hands Free Profile) and A2DP (Advanced Audio Distribution Profile) and AVRCP (Audio/Video Remote Control Profile); and disconnecting the first communication interface and causing the second communication interface to transfer the sound data include disconnecting the A2DP and the AVRCP of the first communication interface connected between the in-vehicle apparatus and the communication counterparty apparatus while keeping the HFP of the first communication interface connected between the in-vehicle apparatus and the communication counterparty apparatus and causing the second communication interface to transfer the sound data, when the transfer of the sound data by the second communication interface is requested by the user while (i) the HFP, the A2DP and the AVRCP of the first communication interface are connected to the communication counterparty apparatus and (ii) the sound data is being transferred by the A2DP of the first communication interface.

* * * * *